United States Patent
Kanazawa

(10) Patent No.: US 9,535,536 B2
(45) Date of Patent: Jan. 3, 2017

(54) TOUCH PANEL CONTROLLER AND ELECTRONIC DEVICE

(71) Applicant: SHARP KABUSHIKI KAISHA, Osaka-shi, Osaka (JP)

(72) Inventor: Yusuke Kanazawa, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/895,026

(22) PCT Filed: Apr. 8, 2014

(86) PCT No.: PCT/JP2014/060215
§ 371 (c)(1),
(2) Date: Dec. 1, 2015

(87) PCT Pub. No.: WO2014/208175
PCT Pub. Date: Dec. 31, 2014

(65) Prior Publication Data
US 2016/0110022 A1    Apr. 21, 2016

(30) Foreign Application Priority Data

Jun. 28, 2013  (JP) ................................. 2013-137254

(51) Int. Cl.
*G06F 3/041* (2006.01)
*G06F 3/044* (2006.01)
(52) U.S. Cl.
CPC ............. *G06F 3/0418* (2013.01); *G06F 3/044* (2013.01); *G06F 3/0416* (2013.01)

(58) Field of Classification Search
None
See application file for complete search history.

(56) References Cited

U.S. PATENT DOCUMENTS

2014/0104236 A1   4/2014  Hamaguchi et al.

FOREIGN PATENT DOCUMENTS

| JP | 2007-533044 A | 11/2007 |
| JP | 2010-244357 A | 10/2010 |
| JP | 2011-138316 A | 7/2011 |
| JP | 2013-003603 A | 1/2013 |
| WO | WO 2005/114369 A2 | 12/2005 |

OTHER PUBLICATIONS

International Search Report issued in PCT/JP2014/060215 dated Jun. 24, 2014.
Written Opinion of the International Searching Authority issued in PCT/JP2014/060215 dated Jun. 24, 2014.

*Primary Examiner* — Nicholas Lee
(74) *Attorney, Agent, or Firm* — Birch, Stewart, Kolasch & Birch, LLP

(57) ABSTRACT

A touch panel controller of the invention is provided with a driving unit which drives drive lines and causes a linear sum signal based on charges accumulated in respective electrostatic capacitances to be output from a sense line, and a correction processing unit which corrects influence on a change in the electrostatic capacitances by a parasitic capacitance which exists in the sense line. Thereby, it is possible to provide the touch panel controller and an electronic device capable of performing estimation of an electrostatic capacitance value more correctly by correcting the influence of the parasitic capacitance which exists in the sense line.

4 Claims, 10 Drawing Sheets

F I G. 3
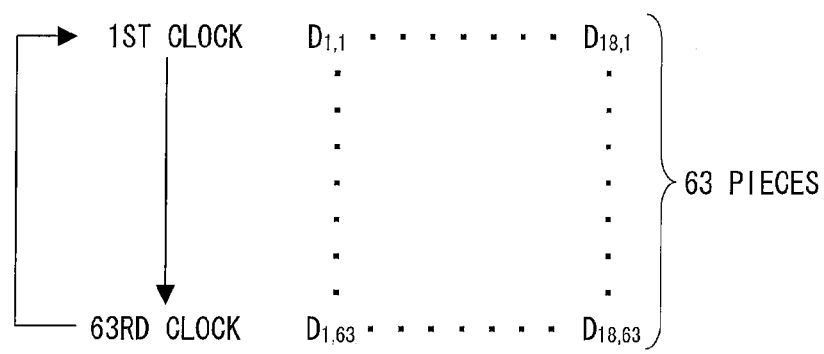

TOUCH PANEL CONTROLLER AND ELECTRONIC DEVICE

TECHNICAL FIELD

The present invention relates to a touch panel controller and an electronic device including the touch panel controller.

BACKGROUND ART

As a device which detects values of electrostatic capacitances which are distributed in a matrix manner, PTL 1 discloses a touch panel device which detects (estimates) distribution of values of respective electrostatic capacitances of an electrostatic capacitance matrix formed between K drive lines and L sense lines.

The touch panel device described in PTL 1 above, when a user touches a touch panel with an object to be detected such as a finger or a pen, detects a change (for example, decrease) in a value of an electrostatic capacitance at a touched position to thereby detect the position on the touch panel, which is touched by the user.

Specifically, a touch panel system 100 described in PTL 1 includes a touch panel 101 and a touch panel controller 110 as illustrated in FIG. 9. The touch panel 101 includes four drive lines $DL_1$ to $DL_4$ (K=4) and four sense lines $SL_1$ to $SL_4$ (L=4), and electrostatic capacitances C11 to C44 are respectively formed at positions where the drive lines $DL_1$ to $DL_4$ and the sense lines $SL_1$ to $SL_4$ intersect with each other.

The touch panel controller 110 is provided with a driving unit 111, and the driving unit 111 drives the drive lines $DL_1$ to $DL_4$ based on code sequences. As the code sequences, specifically, an M-sequence which is a binary pseudo random number sequence with a sequence length of N=31 is used as indicated in FIG. 10.

Here, description will be given by assuming that Drives 1 to 4 in the code sequences with the sequence length of N=31 indicated in FIG. 10 are allocated as signals for driving the drive lines $DL_1$ to $DL_4$. Elements of the code sequences are either "1" or "−1".

The driving unit 111 applies a voltage "Vdrive" illustrated in FIG. 9 when the element of the code sequence is "1", and applies "−Vdrive" when the element of the code sequence is "−1".

The touch panel system 100 has two differential amplifiers 112 which are connected to the sense lines $SL_1$ and $SL_2$ and the sense lines $SL_3$ and $SL_4$. The differential amplifiers 112 receive linear sum signals based on respective electrostatic capacitances C11 to C14, C21 to C24, C31 to C34 and C41 to C44, which are output from the sense lines $SL_1$ to $SL_4$ when the driving unit 111 drives the drive lines $DL_1$ to $DL_4$, and amplify a difference thereof.

Here, an operation of the touch panel system 100 will be described by exemplifying an operation of the differential amplifier 112 to which the sense lines $SL_3$ and $SL_4$ are connected.

The driving unit 111 drives the drive lines by the four Drives 1 to 4 among Drives 1 to 31 indicated in FIG. 10.

For example, the driving unit 111 applies the voltage "Vdrive" to the drive lines $DL_1$, $DL_3$ and $DL_4$ and applies the voltage "−Vdrive" to the drive line $DL_2$ in driving with a 1st Vector indicated in FIG. 10. At this time, an input and an output of the differential amplifier 112 are short-circuited, an integration capacitance Cint which is connected to the differential amplifier 112 is in a reset state, and all the sense lines are operated to have a voltage of zero. That is, in a case where charges accumulated in the electrostatic capacitances C31 to C34 and C41 to C44 are $Q_{31}$ to $Q_{34}$ and $Q_{41}$ to $Q_{44}$, respectively, when a charge amount is calculated with a sense line voltage as a reference, $Q_{31}$ to $Q_{34}$ and $Q_{41}$ to $Q_{44}$ are provided by $$Q_{31}=-V_{drive} \cdot C_{31}, Q_{32}=-V_{drive} \cdot C_{32}, Q_{33}=-V_{drive} \cdot C_{33},$$
$$Q_{34}=-V_{drive} \cdot C_{34}$$

$$Q_{41}=-V_{drive} \cdot C_{41}, Q_{42}=-V_{drive} \cdot C_{42}, Q_{43}=-V_{drive} \cdot C_{43},$$
$$Q_{44}=-V_{drive} \cdot C_{44}. \quad \text{[Expression 1]}$$

Note that, electrostatic capacitance values of the electrostatic capacitances C11 to C44 are indicated by $C_{11}$ to $C_{44}$, respectively.

Next, a state where a short-circuit state of the differential amplifier 112 is released is considered. The driving unit 111 operates all the drive lines to have a voltage of zero. When respective input voltages of the differential amplifier 112 are X3 and X4 and respective output voltages are Y3 and Y4, sums $Q_{Y3}$ and $Q_{Y4}$ of charges accumulated in capacitances connected to the differential amplifier 112 are provided by $$Q_{Y3}=X3 \cdot (C_{30}+C_{32}+C_{33}+C_{34})+(X3-Y3)C_{int}$$

$$Q_{Y4}=X4 \cdot (C_{41}+C_{42}+C_{43}+C_{44})+(X4-Y4)C_{int}. \quad \text{[Expression 2]}$$

In accordance with the law of conservation of charge, $$Q_{Y3}=Q_{31}+Q_{32}+Q_{33}+Q_{34}$$

$$Q_{Y4}=Q_{41}+Q_{42}+Q_{43}+Q_{44} \quad \text{[Expression 3]}$$

are established, and the output voltages Y3 and Y4 of the differential amplifier 112 are respectively provided by $$\begin{cases} X3 \cdot (C_{31}+C_{32}+C_{33}+C_{34})+(X3-Y3)C_{int} = \\ -V_{drive} \cdot C_{31}+V_{drive} \cdot C_{32}-V_{drive} \cdot C_{33}-V_{drive} \cdot C_{34} \\ X4 \cdot (C_{41}+C_{42}+C_{43}+C_{44})+(X4-Y4)C_{int} = \\ -V_{drive} \cdot C_{41}+V_{drive} \cdot C_{42}-V_{drive} \cdot C_{43}-V_{drive} \cdot C_{44} \end{cases} \quad \text{[Expression 4]}$$

and thus, $$\begin{cases} Y3 = \dfrac{V_{drive} \cdot C_{31}-V_{drive} \cdot C_{32}+V_{drive} \cdot C_{33}+V_{drive} \cdot C_{34}}{C_{int}} + \\ \quad \dfrac{X3 \cdot (C_{31}+C_{32}+C_{33}+C_{34}+C_{int})}{C_{int}} \\ Y4 = \dfrac{V_{drive} \cdot C_{41}-V_{drive} \cdot C_{42}+V_{drive} \cdot C_{43}+V_{drive} \cdot C_{44}}{C_{int}} + \\ \quad \dfrac{X4 \cdot (C_{41}+C_{42}+C_{43}+C_{44}+C_{int})}{C_{int}} \end{cases}$$

Here, a difference between signals Y3 and Y4 of output terminals of the differential amplifier 112 is provided by $$Y3-Y4 = \dfrac{V_{drive} \cdot (C_{31}-C_{41})-V_{drive} \cdot (C_{32}-C_{42})+V_{drive} \cdot (C_{33}-C_{43})+V_{drive} \cdot (C_{34}-C_{44})}{C_{int}} + \dfrac{X3 \cdot (C_{31}+C_{32}+C_{33}+C_{34}+C_{int})-X4 \cdot (C_{41}+C_{42}+C_{43}+C_{44}+C_{int})}{C_{int}}. \quad \text{[Expression 5]}$$

Here, it is set that "$C_{31}+C_{32}+C_{33}+C_{34}+C_{int}$" and "$C_{41}+C_{42}+C_{43}+C_{44}+C_{int}$" are provided by a capacitance $C_{all}$ which is almost equal thereto. That is, it is assumed that $$C_{all} \approx C_{31}+C_{32}+C_{33}+c_{34}+C_{int}$$

$$C_{all} \approx C_{41}+C_{42}+C_{43}+C_{44}+C_{int}. \qquad \text{[Expression 6]}$$

When a gain of the differential amplifier 112 is sufficiently large, X3–X4 is regarded as being almost zero, so that an output signal $Y34_1$ of the differential amplifier 112, which is obtained in the driving by the 1st Vector indicated in FIG. 10, is provided by the difference between the signals Y3 and Y4 of the output terminals of the differential amplifier 112 and able to be represented as $$Y34_1 = Y3 - Y4 \qquad \text{[Expression 7]}$$

$$= \frac{V_{drive}}{C_{int}}[(C_{31}-C_{41})-(C_{32}-C_{42})+$$

$$(C_{33}-C_{43})+(C_{34}-C_{44})]+(X3-X4)\frac{C_{all}}{C_{int}}$$

$$= \frac{V_{drive}}{C_{int}}[(C_{31}-C_{41})-(C_{32}-C_{42})+$$

$$(C_{33}-C_{43})+(C_{34}-C_{44})].$$

When code sequences used for i-th driving, which are provided to the drive lines $DL_1$ to $DL_4$, in the code sequences indicated in FIG. 10, that is, the Drive 1, the Drive 2, the Drive 3 and the Drive 4 in the i-th Vector indicated in FIG. 10 are Di1, Di2, Di3 and Di4, respectively, the output signal $Y34_i$ of the differential amplifier 112 is provided by $$Y34_i = Y3_i - Y4_i \qquad \text{[Expression 8]}$$

$$= \frac{V_{drive}}{C_{int}}[D_{i1}(C_{31}-C_{41})+D_{i2}(C_{32}-C_{42})+$$

$$D_{i3}(C_{33}-C_{43})+D_{i4}(C_{34}-C_{44})].$$

Thirty one signals $Y34_1$ to $Y34_{31}$ are obtained by driving with the 1st vector to a 31th vector indicated in FIG. 10. By executing computation of inner products of the thirty one signals $Y34_1$ to $Y34_{31}$ and four code sequences with the sequence length of 31 applied to the respective drive lines $DL_1$ to $DL_4$, electrostatic capacitances connected to the respective drive lines are able to be estimated.

For example, when estimation of the electrostatic capacitances C31 to C41 is performed by using a code sequence "$D_{i1}$" used for driving of the drive line $DL_1$, it is represented by a following formula.

$$\sum_{i=1}^{31}(Y3_i-Y4_i)D_{i1} = \qquad \text{[Expression 9]}$$

$$\sum_{i=1}^{31}\left(\frac{V_{drive}}{C_{int}}[D_{i1}(C_{31}-C_{41})+D_{i2}(C_{32}-C_{42})+\right.$$

$$\left.D_{i3}(C_{33}-C_{43})+D_{i4}(C_{34}-C_{44})]D_{i1}\right)$$

Here, an M-sequence is known that an inner product of the same sequences takes the same value as a sequence length and an inner product of different sequences takes a value of −1. Accordingly, the aforementioned formula becomes $$\sum_{i=1}^{31}(Y3_i-Y4_i)D_{i1} = \qquad \text{[Expression 10]}$$

$$\frac{V_{drive}}{C_{int}}[31(C_{31}-C_{41})-(C_{32}-C_{42})-$$

$$(C_{33}-C_{43})-(C_{34}-C_{44})].$$

Here, if the electrostatic capacitance values $C_{31}$ to $C_{44}$ of the respective electrostatic capacitances C31 to C44 have the almost same value by assuming that all the sense lines $SL_1$ to $SL_4$ and all the drive lines $DL_1$ to $DL_4$ are respectively created with a uniform width, a coefficient by which the electrostatic capacitances C31 to C41 are multiplied is thirty-one times larger than those of other electrostatic capacitances C32 to C42, C33 to C43 and C34 to C44, so that influence of other electrostatic capacitances C32 to C42, C33 to C43 and C34 to C44 becomes negligibly small and the aforementioned formula is able to be simplified as $$\sum_{i=1}^{31}(Y3_i-Y4_i)D_{i1} \approx \frac{V_{drive}}{C_{int}}[31(C_{31}-C_{41})], \qquad \text{[Expression 11]}$$

so that the electrostatic capacitance values $C_{31}$ to $C_{41}$ of the electrostatic capacitances C31 to C41 are able to be estimated.

CITATION LIST

Patent Literature

PTL 1: Japanese Unexamined Patent Application Publication No. 2013-3603 (Published on Jan. 7, 2013)

SUMMARY OF INVENTION

Technical Problem

Meanwhile, the conventional touch panel system 100 disclosed in PTL 1 above deals with correction for a case where electrostatic capacitances between sense lines and drive lines are not uniform, for example, because the drive lines and the sense lines are not disposed uniformly due to influence of a manufacturing process.

However, in addition to such a problem, an input of the differential amplifier 112 is accompanied by parasitic capacitances Cp1 to Cp4 (note that, parasitic capacitances Cp1 and Cp2 are omitted in FIG. 9) between sense lines and a ground as illustrated in FIG. 9, and an error is caused in an estimation value of each of the electrostatic capacitance values $C_{11}$ to $C_{44}$ in some cases due to influence of the parasitic capacitances Cp1 to Cp4.

Here, when the parasitic capacitances Cp3 and Cp4 exist, a short-circuit state of the charges accumulated in the electrostatic capacitances $C_{31}$ to $C_{34}$ and $C_{41}$ to $C_{44}$ obtained in the driving with the 1st Vector and the differential amplifier 112 is released, and sums $Q_{Y3}$ and $Q_{Y4}$ of the charges in a state where all the drive lines $DL_1$ to $DL_4$ are operated to have a voltage of zero are respectively provided by as follows:

$$Q_{31}=-V_{drive}\cdot C_{31},\ Q_{32}=V_{drive}\cdot C_{32},\ Q_{33}=-V_{drive}\cdot C_{33},\ Q_{34}=-V_{drive}\cdot C_{34}$$

$$Q_{41}=-V_{drive}\cdot C_{41},\ Q_{42}=V_{drive}\cdot C_{42},\ Q_{43}=-V_{drive}\cdot C_{43},\ Q_{44}=-V_{drive}\cdot C_{44},$$

thus, $$Q_{Y3}=X3\cdot(C_{31}+C_{32}+C_{33}+C_{34})+(X3-Y3)C_{int}+X3\cdot Cp3$$

$$Q_{Y4}=X4\cdot(C_{41}+C_{42}+C_{43}+C_{44})+(X4-Y4)C_{int}+X4\cdot Cp4. \quad \text{[Expression 12]}$$

Accordingly, the output voltages Y3 and Y4 of the differential amplifier 112 are respectively provided by as follows:

$$\begin{cases} X3\cdot(C_{31}+C_{32}+C_{33}+C_{34})+(X3-Y3)C_{int}+X3\cdot Cp3 = -V_{drive}\cdot(C_{31}-C_{32}+C_{33}+C_{34}) \\ X4\cdot(C_{41}+C_{42}+C_{43}+C_{44})+(X4-Y4)C_{int}+X4\cdot Cp4 = -V_{drive}\cdot(C_{41}-C_{42}+C_{43}+C_{44}) \end{cases}, \quad \text{[Expression 13]}$$

thus, $$\begin{cases} Y3 = \dfrac{V_{drive}\cdot C_{31}-V_{drive}\cdot C_{32}+V_{drive}\cdot C_{33}+V_{drive}\cdot C_{34}}{C_{int}} + \dfrac{X3\cdot(C_{31}+C_{32}+C_{33}+C_{34}+C_{int}+Cp3)}{C_{int}} \\ Y4 = \dfrac{V_{drive}\cdot C_{41}-V_{drive}\cdot C_{42}+V_{drive}\cdot C_{43}+V_{drive}\cdot C_{44}}{C_{int}} + \dfrac{X4\cdot(C_{41}+C_{42}+C_{43}+C_{44}+C_{int}+Cp4)}{C_{int}}. \end{cases}$$

Similarly to the above, it is set that "$C_{31}+C_{32}+C_{33}+C_{34}+C_{int}$" and "$C_{41}+C_{42}+C_{43}+C_{44}+C_{int}$" are provided by the capacitance $C_{all}$ which is almost equal thereto. When the gain of the differential amplifier 112 is sufficiently large similarly to the above, if X3−X4 is able to be regarded as being almost zero, the following is provided:

$$Y3 - Y4 = \dfrac{V_{drive}}{C_{int}}[(C_{31}-C_{41})-(C_{32}-C_{42})+(C_{33}-C_{43})+(C_{34}-C_{44})] + \quad \text{[Expression 14]}$$

$$(X3-X4)\dfrac{C_{all}}{C_{int}} + X3\dfrac{Cp3}{C_{int}} - X4\dfrac{Cp4}{C_{int}}$$

$$= \dfrac{V_{drive}}{C_{int}}[(C_{31}-C_{41})-(C_{32}-C_{42})+(C_{33}-C_{43})+(C_{34}-C_{44})] +$$

$$X3\dfrac{Cp3}{C_{int}} - X4\dfrac{Cp4}{C_{int}}.$$

Similarly to the above, when the Drive 1, the Drive 2, the Drive 3 and the Drive 4 in the i-th Vector are Di1, Di2, Di3 and Di4, respectively, the output $Y34_i$ of the differential amplifier 112 is provided by $$Y34_i = \quad \text{[Expression 15]}$$

$$Y3_i - Y4_i = \dfrac{V_{drive}}{C_{int}}[D_{i1}(C_{31}-C_{41})+D_{i2}(C_{32}-C_{42})+$$

$$D_{i3}(C_{33}-C_{43})+D_{i4}(C_{34}-C_{44})] +$$

$$X3_i\dfrac{Cp3}{C_{int}} - X4_i\dfrac{Cp4}{C_{int}}.$$

Here, $X3_i$ and $X4_i$ are considered. When the Drive 1, the Drive 2, the Drive 3 and the Drive 4 in the i-th Vector are $D_{i1}$, $D_{i2}$, $D_{i3}$ and $D_{i4}$, respectively, the aforementioned formula becomes $$\begin{cases} X3_i\cdot(C_{31}+C_{32}+C_{33}+C_{34})+(X3_i-Y3_i)C_{int}+X3_i\cdot Cp3 = -V_{drive}\cdot(D_{i1}C_{31}+D_{i2}C_{32}+D_{i3}C_{33}+D_{i4}C_{34}) \\ X4_i\cdot(C_{41}+C_{42}+C_{43}+C_{44})+(X4_i-Y4_i)C_{int}+X4_i\cdot Cp4 = -V_{drive}\cdot(D_{i1}C_{41}+D_{i2}C_{42}+D_{i3}C_{43}+D_{i4}C_{44}) \end{cases} \quad \text{[Expression 16]}$$

and when it is summed up as to $X3_i$ and $X4_i$, the following is provided:

$$\begin{cases} X3_i = \dfrac{-V_{drive} \cdot (D_{i1}C_{31} + D_{i2}C_{32} + D_{i3}C_{33} + D_{i4}C_{34}) + Y3_i C_{int}}{C_{31} + C_{32} + C_{33} + C_{34} + C_{int} + Cp3} \\ X4_i = \dfrac{-V_{drive} \cdot (D_{i1}C_{41} + D_{i2}C_{42} + D_{i3}C_{43} + D_{i4}C_{44}) + Y4_i C_{int}}{C_{41} + C_{42} + C_{43} + C_{44} + C_{int} + Cp4} \end{cases}$$

[Expression 17]

By using the output signal $Y34_i$ of the differential amplifier 112 and a common mode voltage Vcm, signals $Y3_i$ and $Y4_i$ of the respective output terminals of the differential amplifier 112 are able to be represented as $$\begin{cases} Y3_i = \dfrac{Y34_i}{2} + Vcm \\ Y4_i = -\dfrac{Y34_i}{2} + Vcm. \end{cases}$$

[Expression 18]

Accordingly, modification is able to be performed as follows:

$$\begin{cases} X3_i = \dfrac{-V_{drive} \cdot (D_{i1}C_{31} + D_{i2}C_{32} + D_{i3}C_{33} + D_{i4}C_{34}) + \left(\dfrac{Y34_i}{2} + Vcm\right) \cdot C_{int}}{C_{all} + Cp3} \\ X4_i = \dfrac{-V_{drive} \cdot (D_{i1}C_{41} + D_{i2}C_{42} + D_{i3}C_{43} + D_{i4}C_{44}) + \left(-\dfrac{Y34_i}{2} + Vcm\right) \cdot C_{int}}{C_{all} + Cp4} \end{cases}$$

[Expression 19]

For simplifying formulas, $Q_{tot}$ which is able to be represented by $$Q_{tot,i} = -\frac{V_{drive}}{2}[D_{i1}(C_{31} + C_{41}) + D_{i2}(C_{32} + C_{42}) + D_{i3}(C_{33} + C_{43}) + D_{i4}(C_{34} + C_{44})]$$

[Expression 22]

$$\begin{cases} X3_i = \dfrac{-V_{drive} \cdot (D_{i1}C_{31} + D_{i2}C_{32} + D_{i3}C_{33} + D_{i4}C_{34})}{C_{all} + Cp3} + \dfrac{\left(\dfrac{V_{drive}}{2C_{int}}\left[\begin{array}{l} D_{i1}(C_{31} - C_{41}) + D_{i2}(C_{32} - C_{42}) + \\ D_{i3}(C_{33} - C_{43}) + D_{i4}(C_{34} - C_{44}) \end{array}\right] + \dfrac{X3_i \dfrac{Cp3}{C_{int}} - X4_i \dfrac{Cp4}{C_{int}}}{2} + Vcm\right) C_{int}}{C_{all} + Cp3} \\ X4_i = \dfrac{-V_{drive} \cdot (D_{i1}C_{41} + D_{i2}C_{42} + D_{i3}C_{43} + D_{i4}C_{44})}{C_{all} + Cp4} + \dfrac{\left(\dfrac{-V_{drive}}{2C_{int}}\left[\begin{array}{l} D_{i1}(C_{31} - C_{41}) + D_{i2}(C_{32} - C_{42}) + \\ D_{i3}(C_{33} - C_{43}) + D_{i4}(C_{34} - C_{44}) \end{array}\right] + \dfrac{-X3_i \dfrac{Cp3}{C_{int}} - X4_i \dfrac{Cp4}{C_{int}}}{2} + Vcm\right) C_{int}}{C_{all} + Cp4} \end{cases}$$

[Expression 20]

$$\begin{cases} X3_i = \dfrac{\dfrac{-V_{drive}}{2}\left[\begin{array}{l} D_{i1}(C_{31} + C_{41}) + D_{i2}(C_{32} + C_{42}) + \\ D_{i3}(C_{33} + C_{43}) + D_{i4}(C_{34} + C_{44}) \end{array}\right] + \left(\dfrac{X3_i \dfrac{Cp3}{C_{int}} - X4_i \dfrac{Cp4}{C_{int}}}{2} + Vcm\right) C_{int}}{C_{all} + Cp3} \\ X4_i = \dfrac{\dfrac{-V_{drive}}{2}\left[\begin{array}{l} D_{i1}(C_{31} + C_{41}) + D_{i2}(C_{32} + C_{42}) + \\ D_{i3}(C_{33} + C_{43}) + D_{i4}(C_{34} + C_{44}) \end{array}\right] + \left(\dfrac{-X3_i \dfrac{Cp3}{C_{int}} + X4_i \dfrac{Cp4}{C_{int}}}{2} + Vcm\right) C_{int}}{C_{all} + Cp4} \end{cases}$$

[Expression 21]

is assumed. In this case, the aforementioned formula becomes $$\begin{cases} X3_i = \dfrac{Q_{tot,i} + \left(\dfrac{X3_i\dfrac{Cp3}{C_{int}} - X4_i\dfrac{Cp4}{C_{int}}}{2} + Vcm\right)C_{int}}{C_{all} + Cp3} \\ X4_i = \dfrac{Q_{tot,i} + \left(\dfrac{-X3_i\dfrac{Cp3}{C_{int}} + X4_i\dfrac{Cp4}{C_{int}}}{2} + Vcm\right)C_{int}}{C_{all} + Cp4} \end{cases}$$
[Expression 23]

Each of $X3_i$ and $X4_i$ is summarized as follows:

$$\begin{cases} (C_{all} + Cp3)X3_i = Q_{tot,i} + \left(X3_i\dfrac{Cp3}{2C_{int}} - X4_i\dfrac{Cp4}{2C_{int}} + Vcm\right)C_{int} \\ (C_{all} + Cp4)X4_i = Q_{tot,i} + \left(-X3_i\dfrac{Cp3}{2C_{int}} + X4_i\dfrac{Cp4}{2C_{int}} + Vcm\right)C_{int} \end{cases}$$
[Expression 24]

$$\begin{cases} \left(C_{all} + \dfrac{Cp3}{2}\right)X3_i = Q_{tot,i} + \left(-X4_i\dfrac{Cp4}{C_{int}} + Vcm\right)C_{int} \\ \left(C_{all} + \dfrac{Cp4}{2}\right)X4_i = Q_{tot,i} + \left(-X3_i\dfrac{Cp3}{2C_{int}} + Vcm\right)C_{int} \end{cases}$$

$$\begin{cases} X3_i = \dfrac{Q_{tot,i} - X4_i\dfrac{Cp4}{2} + VcmC_{int}}{\left(C_{all} + \dfrac{Cp3}{2}\right)} \\ X4_i = \dfrac{Q_{tot,i} - X3_i\dfrac{Cp3}{2} + VcmC_{int}}{\left(C_{all} + \dfrac{Cp4}{2}\right)} \end{cases}$$

Thereby, $X3_i$ is obtained as follows:

$$X3_i = \dfrac{Q_{tot,i} - X4_i\dfrac{Cp4}{2} + VcmC_{int}}{\left(C_{all} + \dfrac{Cp3}{2}\right)}$$
[Expression 25]

$$\left(C_{all} + \dfrac{Cp3}{2}\right)X3_i = Q_{tot,i} - X4_i\dfrac{Cp4}{2} + VcmC_{int}$$

$$\left(C_{all} + \dfrac{Cp3}{2}\right)X3_i = Q_{tot,i} - \left(\dfrac{Q_{tot,i} - X3_i\dfrac{Cp3}{2} + VcmC_{int}}{\left(C_{all} + \dfrac{Cp4}{2}\right)}\right)\dfrac{Cp4}{2} + VcmC_{int}$$

$$\left(C_{all} + \dfrac{Cp3}{2}\right)\left(C_{all} + \dfrac{Cp4}{2}\right)X3_i = \left(C_{all} + \dfrac{Cp4}{2}\right)Q_{tot,i} - \left(Q_{tot,i} + \left(-X3_i\dfrac{Cp3}{2} + VcmC_{int}\right)\right)\dfrac{Cp4}{2} + VcmC_{int}\left(C_{all} + \dfrac{Cp4}{2}\right)$$

$$\left(C_{all} + \dfrac{Cp3}{2}\right)\left(C_{all} + \dfrac{Cp4}{2}\right)X3_i = C_{all}Q_{tot,i} + \left(X3_i\dfrac{Cp3}{2} - VcmC_{int}\right)\dfrac{Cp4}{2} + VcmC_{int}\left(C_{all} + \dfrac{Cp4}{2}\right)$$

$$\left(C_{all} + \dfrac{Cp3}{2}\right)\left(C_{all} + \dfrac{Cp4}{2}\right)X3_i - \dfrac{Cp3}{2}\dfrac{Cp4}{2}X3_i = C_{all}Q_{tot,i} + VcmC_{int}C_{all}$$

$$\left(C_{all}^2 + \left(\dfrac{Cp3}{2} + \dfrac{Cp4}{2}\right)C_{all}\right)X3_i = C_{all}Q_{tot,i} - VcmC_{int}C_{all}$$

$$X3_i = \dfrac{C_{all}Q_{tot,i} - VcmC_{int}C_{all}}{\left(C_{all}^2 + \left(\dfrac{Cp3}{2} + \dfrac{Cp4}{2}\right)C_{all}\right)}$$

$$X3_i = \dfrac{Q_{tot,i} - VcmC_{int}}{\left(C_{all} + \left(\dfrac{Cp3}{2} + \dfrac{Cp4}{2}\right)\right)}.$$

Similarly, $X4_i$ is also provided by $$X4_i = \dfrac{Q_{tot,i} - X3_i\dfrac{Cp3}{2} + VcmC_{int}}{\left(C_{all} + \dfrac{Cp4}{2}\right)}$$
[Expression 26]

$$\left(C_{all} + \dfrac{Cp4}{2}\right)X4_i = Q_{tot,i} - X3_i\dfrac{Cp3}{2} + VcmC_{int}$$

$$\left(C_{all} + \dfrac{Cp4}{2}\right)X4_i = Q_{tot,i} - \left(\dfrac{Q_{tot,i} - X4_i\dfrac{Cp4}{2} + VcmC_{int}}{\left(C_{all} + \dfrac{Cp3}{2}\right)}\right)\dfrac{Cp3}{2} + VcmC_{int}$$

$$\left(C_{all} + \dfrac{Cp4}{2}\right)\left(C_{all} + \dfrac{Cp3}{2}\right)X4_i = \left(C_{all} + \dfrac{Cp3}{2}\right)Q_{tot,i} - \left(Q_{tot,i} + \left(-X4_i\dfrac{Cp4}{2} + VcmC_{int}\right)\right)\dfrac{Cp3}{2} + VcmC_{int}\left(C_{all} + \dfrac{Cp3}{2}\right)$$

$$\left(C_{all} + \dfrac{Cp4}{2}\right)\left(C_{all} + \dfrac{Cp3}{2}\right)X4_i =$$

-continued $$C_{all}Q_{tot,i} + \left(X4_i\frac{Cp4}{2} - VcmC_{int}\right)\frac{Cp3}{2} +$$

$$VcmC_{int}\left(C_{all} + \frac{Cp3}{2}\right)$$

$$\left(C_{all} + \frac{Cp4}{2}\right)\left(C_{all} + \frac{Cp3}{2}\right)X4_i - \frac{Cp3}{2}\frac{Cp4}{2}X4_i =$$

$$C_{all}Q_{tot,i} + VcmC_{int}C_{all}$$

$$\left(C_{all}^2 + \left(\frac{Cp3}{2} + \frac{Cp4}{2}\right)C_{all}\right)X4_i = C_{all}Q_{tot,i} - VcmC_{int}C_{all}$$

$$X4_i = \frac{C_{all}Q_{tot,i} - VcmC_{int}C_{all}}{\left(C_{all}^2 + \left(\frac{Cp3}{2} + \frac{Cp4}{2}\right)C_{all}\right)}$$

$$X4_i = \frac{Q_{tot,i} - VcmC_{int}}{\left(C_{all} + \left(\frac{Cp3}{2} + \frac{Cp4}{2}\right)\right)}.$$

The influence of $X3_1$ and $X4_1$ above on the output signal $Y34_i$ is considered. The output signal $Y34_i$ is provided by $$Y34_i = Y3_i - Y4_i \quad\text{[Expression 27]}$$
$$= \frac{V_{drive}}{C_{int}}[D_{i1}(C_{31} - C_{41}) + D_{i2}(C_{32} - C_{42}) +$$
$$D_{i3}(C_{33} - C_{43}) + D_{i4}(C_{34} - C_{44})] +$$
$$X3_i\frac{Cp3}{C_{int}} - X4_i\frac{Cp4}{C_{int}}$$
$$= \frac{V_{drive}}{C_{int}}[D_{i1}(C_{31} - C_{41}) + D_{i2}(C_{32} - C_{42}) +$$
$$D_{i3}(C_{33} - C_{43}) + D_{i4}(C_{34} - C_{44})] +$$
$$\frac{Q_{tot,i} - VcmC_{int}}{\left(C_{all} + \frac{Cp3}{2} + \frac{Cp4}{2}\right)C_{int}}(Cp3 - Cp4).$$

Here, when it is assumed that the electrostatic capacitance values $C_{31}$ to $C_{44}$ of the respective electrostatic capacitances C31 to C44 are all the same electrostatic capacitance value Cx, the following is provided:

$$Q_{tot,i} = -\frac{V_{drive}}{2}[D_{i1}(C_{31} + C_{41}) + D_{i2} \quad\text{[Expression 28]}$$
$$(C_{32} + C_{42}) + D_{i3}(C_{33} - C_{43}) + D_{i4}$$
$$(C_{34} - C_{44})]$$
$$= -V_{drive}C_x[D_{i1} + D_{i2} + D_{i3} + D_{i4}]$$

$$C_{all} \approx C_{31} + C_{32} + C_{33} + C_{34} + C_{int} = 4C_x + C_{int}$$

$$Y34_i = \frac{Q_{tot,i} - VcmC_{int}}{\left(C_{all} + \frac{Cp3}{2} + \frac{Cp4}{2}\right)C_{int}}(Cp3 - Cp4)$$
$$= \frac{-V_{drive}C_x[D_{i1} + D_{i2} + D_{i3} + D_{i4}] - VcmC_{int}}{\left(4C_x + C_{int} + \frac{Cp3}{2} + \frac{Cp4}{2}\right)C_{int}}$$
$$(Cp3 - Cp4).$$

Here, when Vdrive and Vcm are fixed values and the capacitances also have fixed values, a component, which changes according to signals for driving the drive lines, in the formula above is $$\frac{-V_{drive}C_x}{\left(4C_x + C_{int} + \frac{Cp3}{2} + \frac{Cp4}{2}\right)C_{int}} \quad\text{[Expression 29]}$$
$$(Cp3 - Cp4)(D_{i1} + D_{i2} + D_{i3} + D_{i4})$$

and serves as signals in proportional to the signals by which a difference Cp3–Cp4 between the parasitic capacitance Cp3 and the parasitic capacitance Cp4 is driven with a sum of the code sequences $(Di_1+Di_2+Di_3+Di_4)$. That is, when there is a difference between the parasitic capacitances (Cp3–Cp4≠0), there is a problem that charges caused by a total value of driving patterns (here, "$D_{i1}+D_{i2}+D_{i3}+D_{i4}$") are mixed with the integration capacitance $C_{int}$ of the differential amplifier 112 and estimation of each of the electrostatic capacitance values $C_{31}$ to $C_{34}$ and $C_{41}$ to $C_{44}$ becomes incorrect.

Therefore, with a technique described in PTL 1, it becomes difficult to operate the touch panel controller excellently.

The invention has been made in view of the aforementioned conventional problems, and an object thereof is to provide a touch panel controller and an electronic device capable of performing estimation of an electrostatic capacitance value more correctly by correcting influence of a parasitic capacitance which exists in a sense line.

Solution to Problem

A touch panel controller in one aspect of the invention is the touch panel controller which obtains, with a change in K electrostatic capacitances which are respectively formed between a sense line and K drive lines (K is an integer of 2 or more) when an object to be detected touches a touch panel having the electrostatic capacitances, a touched position: including a driving unit which drives the drive lines and causes a linear sum signal based on charges accumulated in the respective electrostatic capacitances to be output from the sense line; and a correction unit which corrects influence on the linear sum signal by a parasitic capacitance which exist in the sense line, the driving unit driving the K drive lines in parallel by K code sequences having a sequence length of N (N is an integer), which correspond to the K drive lines, and causing N linear sum signals to be output from the sense line, the touch panel controller further including: an inner product computation unit which estimates values of the K electrostatic capacitances by computation of inner products of the N linear sum signals output from the sense line and the K code sequences having the sequence length of N, the correction unit adding a value, which is obtained by adding weight to a signal based on a value obtained by adding the N linear sum signals, to the values of the K electrostatic capacitances estimated by the inner product computation unit to thereby correct the values of the electrostatic capacitances.

An electronic device in one aspect of the invention includes the touch panel control described above and the touch panel controlled by the touch panel controller.

Effects of Invention

According to one aspect of the invention, there is an effect that a touch panel controller and an electronic device capable of performing estimation of an electrostatic capacitance value more correctly by correcting influence of a parasitic capacitance which exists in a sense line.

BRIEF DESCRIPTION OF DRAWINGS

FIG. 3 is a view illustrating code sequences composed of M-sequences for driving the touch panel device.

DESCRIPTION OF EMBODIMENTS

[Embodiment 1]

One embodiment of the invention will be described based on FIG. 1 to FIG. 3 as follows. Here, configurations described in the embodiment are not intended to limit the scope of the invention only to these unless otherwise specified, but are merely illustrative.

[Configuration of Touch Panel Device]

A configuration of the touch panel device 1 of the present embodiment will be described based on FIG. 2. FIG. 2 is a configuration view illustrating the touch panel device 1 of the present embodiment.

Figure 2:
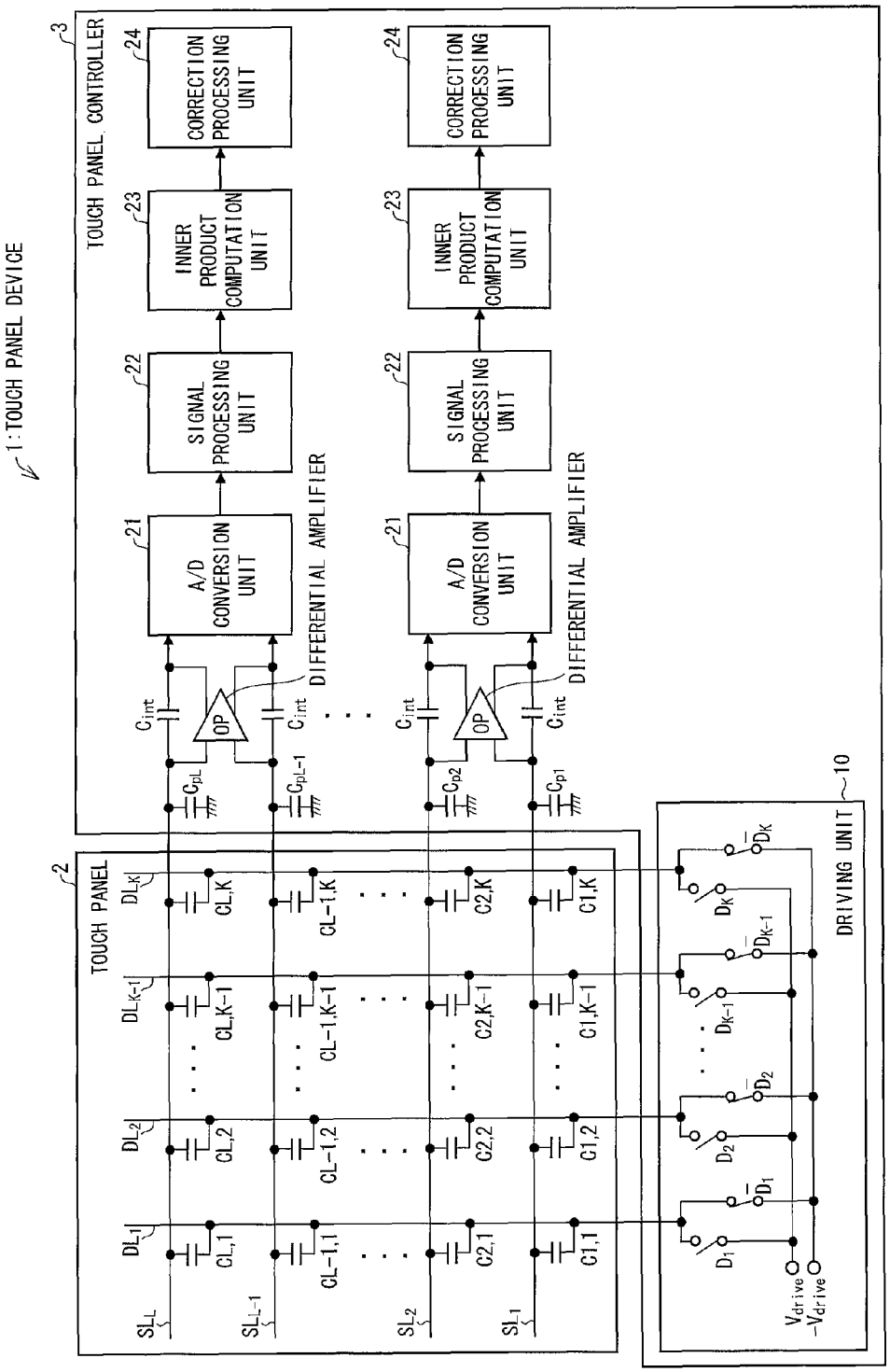
FIG. 2 is a block diagram illustrating an entire configuration of the touch panel device.

The touch panel device 1 of the present embodiment includes a touch panel 2 and a touch panel controller 3 as illustrated in FIG. 2. The touch panel 2 has K drive lines $DL_1$ to $DL_K$ and L sense lines $SL_1$ to $SL_L$. Electrostatic capacitances C1,1 to CL,K are formed at positions where the drive lines $DL_1$ to $DL_K$ and the sense lines $SL_1$ to $SL_L$ are intersect with each other. Note that, it is set that electrostatic capacitance values of the electrostatic capacitances C1,1 to CL,K are $C_{1,1}$ to $C_{L,K}$, respectively.

The sense lines $SL_1$ to $SL_L$ are connected to each differential amplifier OP. Output signals of the differential amplifier OP are converted into digital signals by an AD conversion unit 21 and then input to an inner product computation unit 23 through a signal processing unit 22. Output signals of the inner product computation unit 23 are input to the correction processing unit 24 and an output of the correction processing unit 24 becomes an estimation value of an electrostatic capacitance. Moreover, each of the drive lines $DL_1$ to $DL_K$ is connected to a driving unit 10.

The differential amplifier OP of the present embodiment is formed of a differential amplifier using a differential input-a differential output, and an integration capacitance Cint is disposed between each of input/output terminals. Each of the input terminals of the differential amplifier OP is connected to, for example, the sense lines $SL_1$ and $SL_2$. The respective output signals of the differential amplifier OP are set as Y1 and Y2. The AD conversion unit 21 converts a difference Y1−Y2 between the output signals of the differential amplifier OP into a digital value.

Operations of the driving unit 10, the signal processing unit 22, the inner product computation unit 23 and the correction processing unit 24 in the touch panel device 1 having the aforementioned configuration will be described.

In the touch panel device 1 of the present embodiment, the drive lines $DL_1$ to $DL_K$ are driven by the driving unit 10, and thereby linear sum signals based on charges accumulated in the respective electrostatic capacitances C1,1 to C1,K to CL,1 to CL,K are output from the sense lines $SL_1$ to $SL_L$.

Code sequences $D_1$ to $D_K$ which mutually have low correlation are provided to the driving unit 10, and the driving unit 10 applies a voltage "Vdrive" to a corresponding drive line when a code is "1", and applies a voltage "−Vdrive" to the corresponding drive line when the code is "−1".

The signal processing unit 22 adds the linear sum signals from the differential amplifier OP, which have been subjected to digital conversion, for one cycle period of the code sequences $D_1$ to $D_K$.

The inner product computation unit 23 calculates an inner product of the linear sum signals from the differential amplifier OP, which have been subjected to digital conversion, and the code sequences $D_1$ to $D_K$.

The correction processing unit 24 subtracts a signal, which is obtained by multiplying a signal S to which the output signals of the differential amplifier OP for one cycle period of the code sequences $D_1$ to $D_K$ are added by a coefficient calculated by the number N of the code sequences $D_1$ to $D_K$ and the number K of the drive lines, from an estimation value of an electrostatic capacitance value obtained at the inner product computation unit 23.

In the touch panel device 1 with the aforementioned configuration, the driving unit 10 drives a plurality of drive lines on the touch panel 2 and causes linear sum signals based on charges accumulated in electrostatic capacitances formed at respective intersections with a plurality of sense lines which interest with the plurality of drive lines to be output from the sense lines. Thereby, the touch panel controller 3 estimates electrostatic capacitance values of the electrostatic capacitances formed at the respective intersections and obtains a touched position by a change in the charges accumulated in the electrostatic capacitances when a finger or a touch pen as an object to be detected touches the touch panel 2.

[Operation of Estimation of Electrostatic Capacitance Values by Touch Panel Controller]

An operation of the touch panel controller 3 with the aforementioned configuration will be described below based on FIG. 1. FIG. 1 is a block diagram illustrating a configuration of a touch panel device 1A as one example of the touch panel device 1, which has two sense lines connected to one differential amplifier OP and eighteen drive lines which intersect with the two sense lines, for simplifying the operation of the touch panel controller 3.

Figure 1:
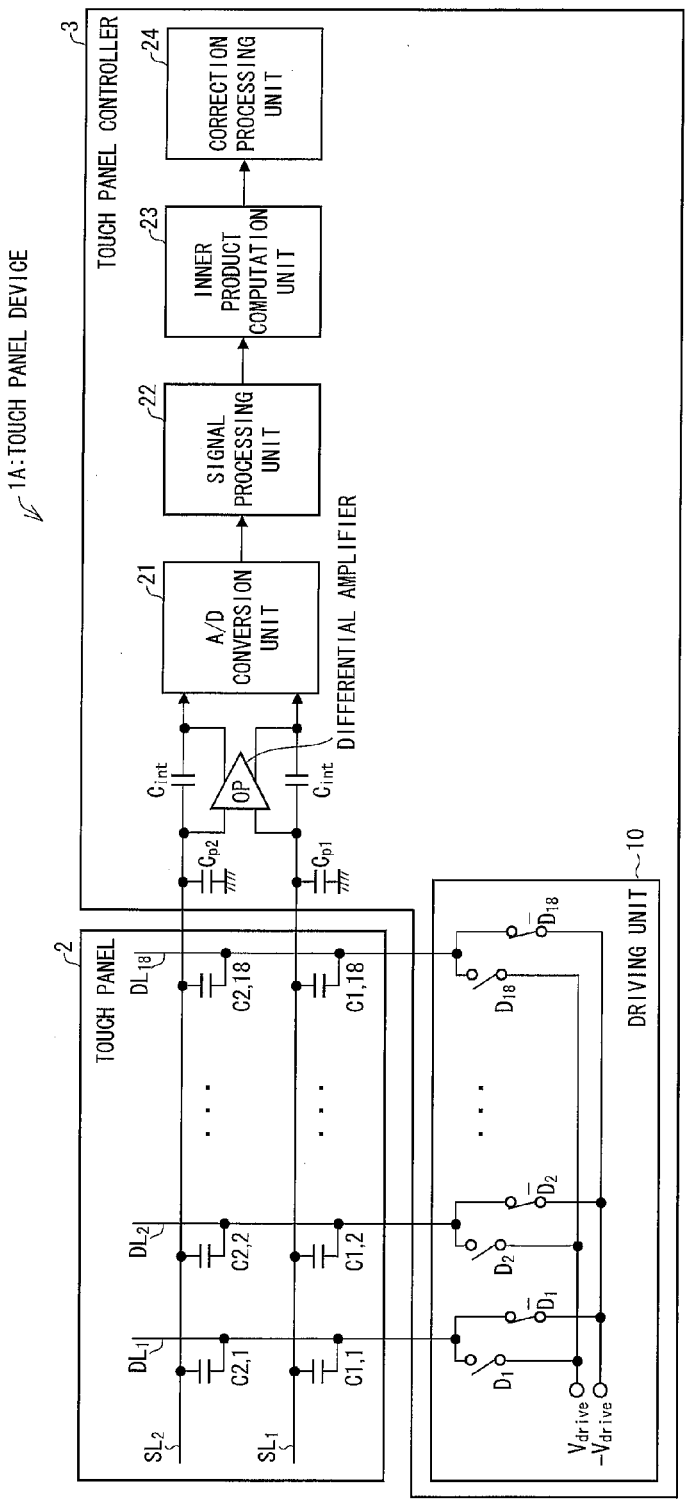
FIG. 1 illustrates a touch panel device in Embodiment 1 of the invention, which is a block diagram illustrating a configuration of a simplified model for explaining an operation.

As illustrated in FIG. 1, the touch panel device 1A has two sense lines $SL_1$ and $SL_2$ (L=2) and eighteen drive lines $DL_1$, $DL_2$, ..., $DL_{18}$ (K=18).

In the touch panel controller 3 of the touch panel device 1A, the driving unit 10 drives the drive lines $DL_1$, $DL_2$, ..., $DL_{18}$ in parallel with eighteen code sequences $D_1$ to $D_{18}$ with a sequence length of N (N is an integer which satisfies N≥K), which are provided to the drive lines $DL_1$, $DL_2$, ..., $DL_{18}$, respectively. As the code sequences $D_1$ to $D_{18}$, code sequences generated by bit-shifting an M-sequence which is a binary pseudo random number sequence with a sequence length of N=63 as illustrated in FIG. 3 are used.

Specifically, values of code sequences $D_{1,1}$ to $D_{18,1}$, ..., $D_{1,63}$ to $D_{18,63}$ are changed by bit-shift for each clock. In a first clock, the drive lines $DL_1$, $DL_2$, ..., $DL_{18}$ are driven by $D_{1,1}$ to $D_{18,1}$. In a second clock, the aforementioned drive lines are driven by $D_{1,2}$ to $D_{18,2}$. Then, in a third clock, the aforementioned drive lines are driven by $D_{1,3}$ to $D_{18,3}$. In a similar manner, in a sixty third clock, the aforementioned drive lines are driven by $D_{1,63}$ to $D_{18,63}$. Next, in the first clock, the aforementioned drive lines are driven by $D_{1,1}$ to $D_{18,1}$ again. In this manner, the code sequences $D_1$ to $D_{18}$ iterate the same value for every sixty three clocks. It is set that a clock signal has 1 MHz. Each of elements of the code sequences $D_1$ to $D_{18}$, that is, each of the codes $D_{1,1}$ to $D_{18,63}$ has either "1" or "−1".

Further, as illustrated in FIG. 1, the driving unit 10 applies the voltage "Vdrive" when the element of the code sequences $D_1$ to $D_{18}$ is "1" and applies the voltage "−Vdrive" when the element of the code sequences $D_1$ to $D_{18}$ is "−1". For example, a power supply voltage VDD is used for the voltage "Vdrive". Moreover, it may be a voltage other than the power supply voltage, such as a reference voltage.

The touch panel device 1A has one differential amplifier OP which is connected to the sense lines $SL_1$ and $SL_2$. The differential amplifier OP receives linear sum signals X1 and X2 based on accumulation in the respective electrostatic capacitances C1,1 to C1,18 and C2,1 to C2,18, which are output from sense lines $SL_1$ and $SL_2$ when the driving unit 10 drives the drive lines $DL_1$ to $DL_{18}$, and amplifies a difference thereof.

For example, in sixty-three driving for the drive lines $DL_1$ to $DL_{18}$ with code sequences $D_{1,i}$ to $D_{18,i}$ (1≤i≤63) of an i-th clock in the code sequences $D_{1,1}$ to $D_{18,1}$, ..., $D_{1,63}$ to $D_{18,63}$ with a sequence length of 63, the driving unit 10 applies either the voltage "Vdrive" or the voltage "−Vdrive". At this time, an output $Y1_i-Y2_i$ which is a linear sum signal $Y_i$ output by the differential amplifier OP to which the sense lines $SL_1$ and $SL_2$ are connected is provided by a following formula (1):

[Expression 30]

$$Y_i = Y1_i - Y2_i = \frac{V_{drive}}{C_{int}}\left[\sum_{j=1}^{K} D_{ij}(C_{1j} - C_{2j})\right]. \quad \text{formula (1)}$$

Note that, the linear sum signal $Y_i$ output by the differential amplifier OP is provided by $Y1_i-Y2_i$.

Here, the respective electrostatic capacitance values $C_{1,1}$ to $C_{1,18}$ of the sense line $SL_1$ and the respective electrostatic capacitance values $C_{2,1}$ to $C_{2,18}$ of the sense line $SL_2$ are able to be estimated by executing computation of inner products of the linear sum signal "$Y_i=Y1_i-Y2_i$ (1≤i≤63)" output by the differential amplifier OP and eighteen code sequences $D_{i,1}$ to $D_{i,18}$ with the sequence length of 63.

For example, when the electrostatic capacitance value of $C_{1,1-2,1}$ of the electrostatic capacitance C1,1-C2,1 is estimated by using the code sequence "$D_{i,1}$" which is used for driving of the drive line $DL_1$, it is represented by a following formula (2).

[Expression 31]

$$C_{11-21} = \sum_{i=1}^{N} Y_i D_{i1}$$

$$= \sum_{j=1}^{N} \frac{V_{drive}}{C_{int}}\left[\sum_{j=1}^{K} D_{ij}(C_{1j} - C_{2j})\right] D_{i1}$$

$$= \frac{V_{drive} N}{C_{int}}(C_{11} - C_{21}) + \frac{V_{drive}}{C_{int}}\sum_{i=1}^{N}\sum_{j=1}^{K} D_{ij} D_{i1}$$

$$(C_{1j} - C_{2j})$$

formula (2)

Here, the M-sequence is known that an inner product of the same sequences takes the same value as a sequence length and an inner product of different sequences takes a value of −1. Thus, the formula (2) is able to be simplified as

[Expression 32]

$$C_{11-21} = \frac{V_{drive} N}{C_{int}}(C_{11} - C_{21}) \quad \text{formula (3)}$$

and the electrostatic capacitance value $C_{1,1-2,1}$ of the electrostatic capacitance C1,1-C2,1 is able to be estimated. Note that, a second term in a right side of the formula (2) is omitted in the formula (3).

[Operation of Correction Processing Unit]

In the touch panel device 1A of the present embodiment, however, an input of the differential amplifier OP is accompanied by the parasitic capacitances Cp1 to Cp2 as illustrated in FIG. 1, and an error is caused in an estimation value of each of the electrostatic capacitance values $C_{1,1}$ to $C_{2,18}$ in some cases due to influence of the parasitic capacitances Cp1 and Cp2. The parasitic capacitance Cp1 is set as a capacitance between the sense line $SL_1$ and the ground. In addition, the parasitic capacitance Cp2 is set as a capacitance between the sense line $SL_2$ and the ground. The parasitic capacitances Cp1 and Cp2 influence the linear sum signals (input signals X1 and X2 to the differential amplifier OP) based on the charges accumulated in the electrostatic capacitances C1,1 to C1,18 to C2,1 to C2,18 from the sense lines $SL_1$ to $SL_2$, respectively.

That is, a parasitic capacitance is generated because a signal wiring has a physical shape. The signal wiring is normally formed of metal having a fixed width, which forms a capacitance between it and some sort of conductor in the periphery. A conductor is normally grounded in an electric circuit in many cases, so that a parasitic capacitance is formed between a signal line and a ground unintentionally.

Here, when there is a difference between the parasitic capacitances Cp1 and Cp2, a problem is posed that charges caused by a total value of driving patterns are mixed with the integration capacitance $C_{int}$ of the differential amplifier OP and estimation of the electrostatic capacitance value $C_{1,1}$-$C_{2,1}$ of the electrostatic capacitance C1,1-C2,1 becomes incorrect.

Thus, the touch panel controller 3 of the touch panel device 1A of the present embodiment is provided with the correction processing unit 24 as a correction unit which corrects influence on a change in the charges of the electrostatic capacitance C1,1-C2,1 by the parasitic capacitances Cp1 and Cp2 which respectively exist in the sense lines $SL_1$ and $SL_2$.

Thereby, the touch panel controller 3 capable of performing estimation of an electrostatic capacitance value more correctly by correcting the influence of the parasitic capacitances Cp1 and Cp2 which exist in the sense lines $SL_1$ and $SL_2$ is provided.

Specific processing of the correction processing unit 24 will be described below.

First, since the linear sum signal Yi output by the differential amplifier OP at the time of i-th driving is provided by a total sum of the code sequence Di as described above, when a coefficient arising from the difference between the parasitic capacitances Cp1 and Cp2 is a, it is provided by:

[Expression 33]

$$Y_i = \frac{V_{drive}}{C_{int}} \left( \sum_{j=1}^{K} D_{ij}(C_{1j} - C_{2j}) \right) + a \sum_{j=1}^{K} D_{ij}. \quad \text{formula (4)}$$

The electrostatic capacitance value is able to be estimated by executing computation of the inner product of the linear sum signal Yi and the code sequence $D_{i,1}$ used for driving of the drive line $DL_1$. Here, $1 \leq i \leq N = 63$.

For example, the electrostatic capacitance value $C_{1,1\text{-}2,1}$ of the electrostatic capacitance C1,1-C2,1 is estimated by

[Expression 34]

$$C_{11-21} = \sum_{i=1}^{N} Y_i D_{i1} \quad \text{formula (5)}$$

$$= \sum_{i=1}^{N} \frac{V_{drive}}{C_{int}} \left( \sum_{j=1}^{K} D_{ij}(C_{1j} - C_{2j}) \right) D_{i1} +$$

$$\sum_{i=1}^{N} a \left( \sum_{j=1}^{K} D_{ij} \right) D_{i1}$$

$$= \frac{V_{drive}N}{C_{int}}(C_{11} - C_{21}) + \frac{V_{drive}}{C_{int}} \sum_{i=1}^{N} \sum_{j \neq 1}^{K} D_{ij}D_{i1}$$

$$(C_{1j} - C_{2j}) + aN + a \sum_{i=1}^{N} \sum_{j \neq 1}^{K} D_{ij}D_{i1}.$$

Here, as described above, when the M-sequence is used as the code sequence Di, since an inner product of the same sequences takes the same value as a sequence length and an inner product of different sequences takes a value of −1 in the M-sequence, the formula (5) becomes

[Expression 35]

$$C_{11-21} = \quad \text{formula (6)}$$

$$\frac{V_{drive}N}{C_{int}}(C_{11} - C_{21}) - \frac{V_{drive}}{C_{int}} \sum_{j \neq 1}^{K}(C_{1j} - C_{2j}) + a(N - K + 1).$$

Ones other than a first term in the formula (6) become an error component.

Here, the correction processing unit 24 of the present embodiment performs correction by using a signal S obtained by adding all the linear sum signals Yi which are obtained by performing driving N times. The signal S is obtained by the following:

[Expression 36]

$$S = \sum_{i=1}^{N} Y_i \quad \text{formula (7)}$$

$$= \sum_{i=1}^{N} \left( \frac{V_{drive}}{C_{int}} \left( \sum_{j=1}^{K} D_{ij}(C_{1j} - C_{2j}) \right) + a \sum_{j=1}^{K} D_{ij} \right)$$

$$= \frac{V_{drive}}{C_{int}} \sum_{i=1}^{N} \sum_{j=1}^{K} D_{ij}(C_{1j} - C_{2j}) + a \sum_{i=1}^{N} \sum_{j=1}^{K} D_{ij}.$$

Here, when the code sequence Di is the M-sequence, since a result that N elements of one M-sequence are all added is 1, the formula (7) becomes

[Expression 37]

$$S = \frac{V_{drive}}{C_{int}} \sum_{i=1}^{N} \sum_{j=1}^{K} D_{ij}(C_{1j} - C_{2j}) + a \sum_{i=1}^{N} \sum_{j=1}^{K} D_{ij} \quad \text{formula (8)}$$

$$= \frac{V_{drive}}{C_{int}} \sum_{j=1}^{K}(C_{1j} - C_{2j}) + aK.$$

Here, when a case where a second term of the formula (6) by which the electrostatic capacitance value $C_{1,1}$-$C_{2,1}$ of the electrostatic capacitance C1,1-C2,1 is estimated is dominant, that is, a case where a is small and "a*(N−M+1)" is small is considered, the formula (6) becomes

[Expression 38]

$$C_{11-21} = \frac{V_{drive}N}{C_{int}}(C_{11} - C_{21}) - \frac{V_{drive}}{C_{int}} \sum_{j \neq 1}^{K}(C_{1j} - C_{2j}). \quad \text{formula (9)}$$

Here, when S indicated in the formula (7) is added to the formula (9),

[Expression 39]

$$C_{11-21} + S \approx \frac{V_{drive}N}{C_{int}}(C_{11} - C_{21}) - \frac{V_{drive}}{C_{int}}\sum_{j \neq 1}^{K}(C_{1j} - C_{2j}) + \frac{V_{drive}}{C_{int}}\sum_{j=1}^{K}(C_{1j} - C_{2j})$$
$$= \frac{V_{drive}(N+1)}{C_{int}}(C_{11} - C_{21})$$

formula (10)

is provided, so that influence of a component arising from the capacitances other than the electrostatic capacitance value $C_{1,1}$-$C_{2,1}$ of the electrostatic capacitance C1,1-C2,1 is able to be reduced.

Next, when considering a case where a third term of the formula (6) by which the electrostatic capacitance value $C_{1,1}$-$C_{2,1}$ of the electrostatic capacitance C1,1-C2,1 is estimated is dominant, the formula (6) becomes

[Expression 40]

$$C_{11-21} = \frac{V_{drive}N}{C_{int}}(C_{11} - C_{21}) + a(N - K + 1).$$

formula (11)

Here, when −(N−M+1)S/M is added to the formula (11),

[Expression 41]

$$C_{11-21} - \frac{(N-K+1)}{K}S \approx \frac{V_{drive}N}{C_{int}}(C_{11}C_{21}) + a(N-K+1)a(N-K+1)$$
$$= \frac{V_{drive}N}{C_{int}}(C_{11} - C_{21})$$

formula (12)

is provided, so that influence of a component arising from the capacitances other than the electrostatic capacitance value $C_{1,1}$-$C_{2,1}$ of the electrostatic capacitance C1,1-C2,1 is able to be reduced.

In this manner, in the touch panel controller 3 of the present embodiment, the signal S based on the values obtained by adding the N linear sum signals is used to correct the estimated electrostatic capacitance value by the correction processing unit 24. This makes it possible to reduce an error between an actual electrostatic capacitance value and the estimated electrostatic capacitance value. Thereby, the touch panel controller 3 of the present embodiment is able to perform estimation of the electrostatic capacitance value more correctly.

Figure 8:
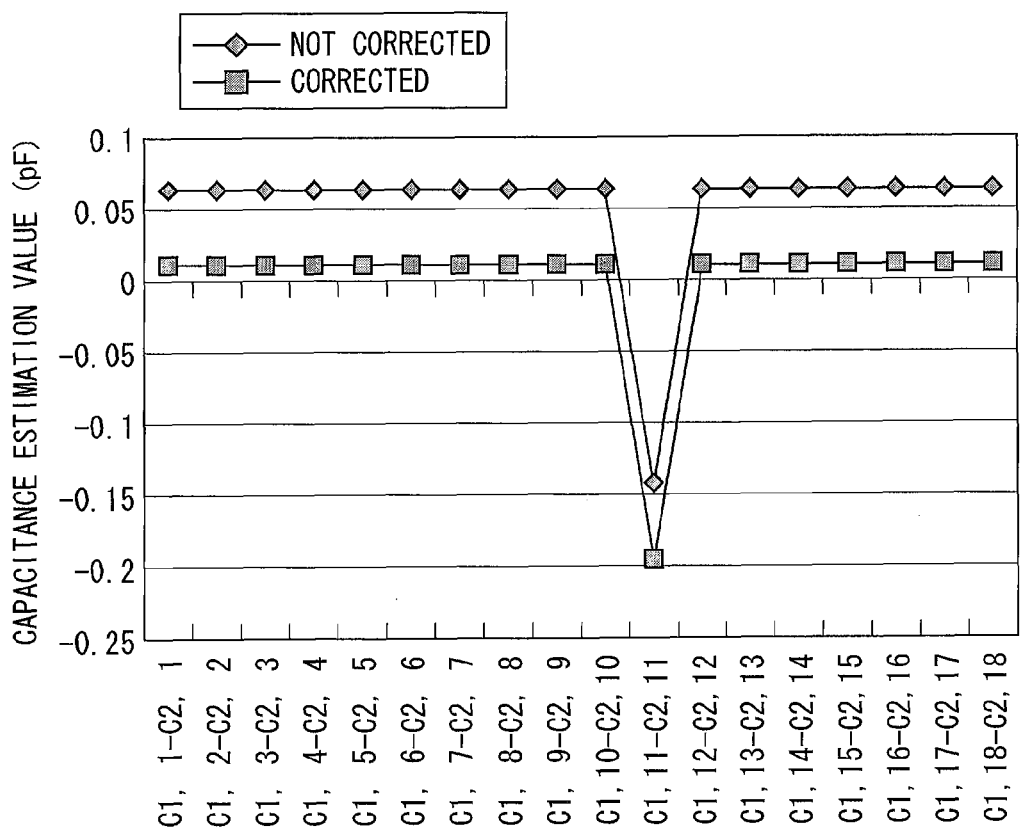
FIG. 8 indicates electrostatic capacitance values of the touch panel device in Example 1 above when there is a touch input, which is a graph indicating electrostatic capacitance values when correction processing is performed and electrostatic capacitance values when correction processing is not performed in comparison.
Figure 9:
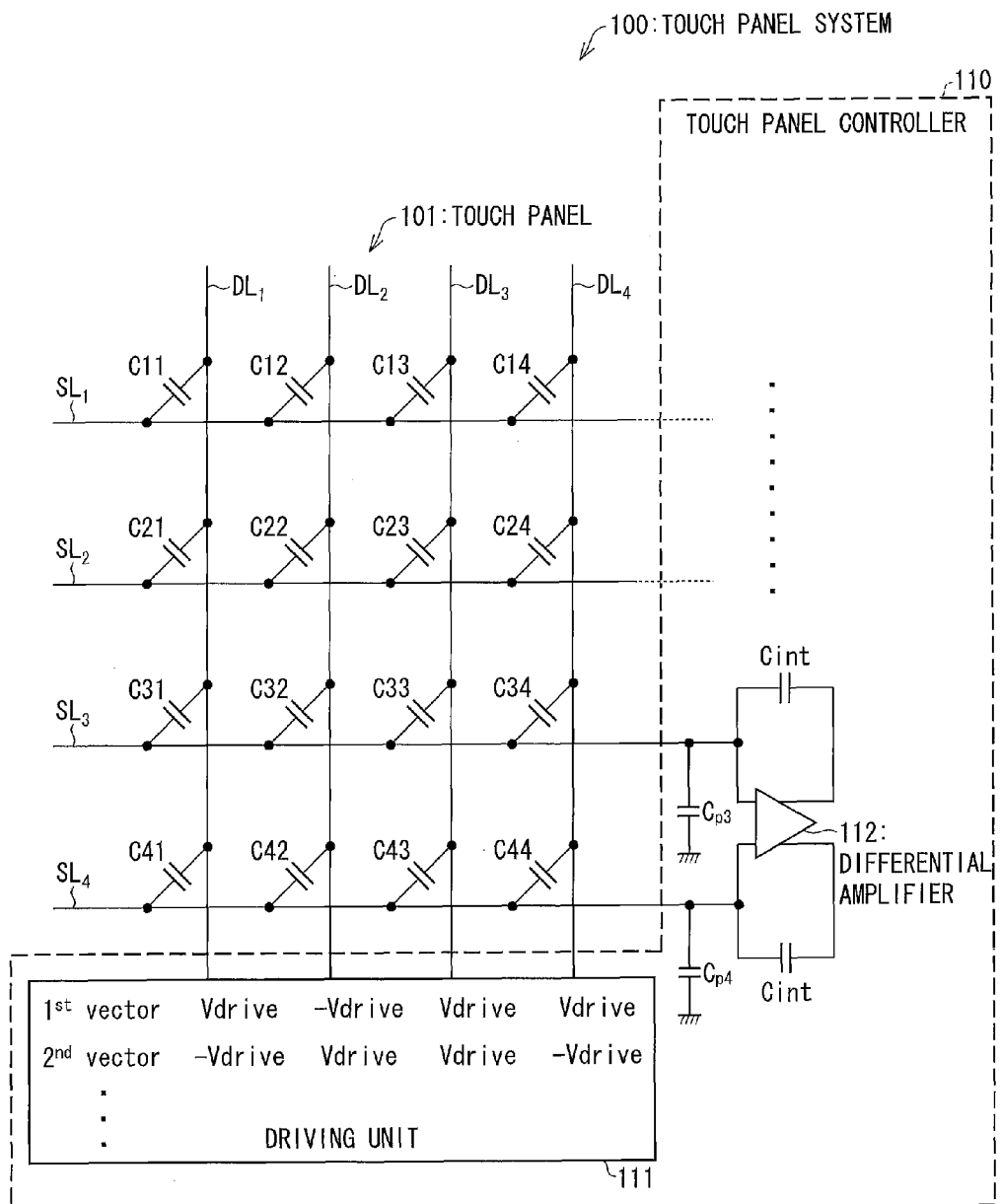
FIG. 9 is a block diagram illustrating a configuration of a conventional touch panel system.
Figure 10:
FIG. 10 is a view indicating code sequences, which are composed of M-sequences, for driving the conventional touch panel system.

Note that, as illustrated in FIG. 8 described below, in the touch panel controller 3 of the present embodiment, when a touch input exists at a certain point (a point corresponding to C1,11-C2,11 in an example illustrated in FIG. 8), other points which exist on the same sense line also react due to influence of the second term and the third term of the formula (6). In the example illustrated in FIG. 8, estimation values of capacitances of other points, which is supposed to be 0 pF essentially, react at about 0.06 pF. The reaction of other points is able to be estimated from an output signal of the AD conversion unit 21, so that an estimated signal is subtracted from all points which exist on the same sense line. A result of performing the subtraction corresponds to a content of "corrected" indicated in FIG. 8. With this correction, the estimation values of the capacitances of other points are able to be corrected from about 0.06 pF to about 0 pF.

In this manner, in the touch panel controller 3 of the present embodiment, a touched position is obtained by a change in electrostatic capacitances formed at respective intersections between the plurality of drive lines and the plurality of sense lines on the touch panel 2, which is caused when an object to be detected touches the touch panel 2.

Meanwhile, in the touch panel controller 3 of this kind, for example, the respective sense lines are accompanied by parasitic capacitances which are mutually different, and an error is caused in an estimation value of each of electrostatic capacitance values due to influence of the parasitic capacitances in some cases.

Thus, the driving unit 10 which drives a plurality of drive lines and causes a linear sum signal based on charges accumulated in electrostatic capacitances formed at respective intersections with a plurality of sense lines to be output from the sense lines, and the correction processing unit 24 which corrects influence on a change in the electrostatic capacitances by a parasitic capacitance which exists for each of the sense lines are provided in the present embodiment. Therefore, an estimation value of each electrostatic capacitance value in which there is substantially no parasitic capacitance is obtained by the correction processing unit 24.

Accordingly, it is possible to provide the touch panel controller 3 capable of performing estimation of an electrostatic capacitance value more correctly by correcting the influence of the parasitic capacitance which exists in a sense line.

In the touch panel controller 3 of the touch panel device 1A in the present embodiment, the driving unit 10 drives the eighteen drive lines $DL_1$ to $DL_{18}$ in parallel with eighteen code sequences with the sequence length of 63, which are applied to the drive lines $DL_1$ to $DL_{18}$, respectively, and causes sixty three linear sum signals based on charges accumulated in electrostatic capacitances at respective eighteen intersections of the eighteen drive lines $DL_1$ to $DL_{18}$ and one sense line $SL_1$ to be output from the sense line $SL_1$, and the inner product computation unit 23 which estimates electrostatic capacitance values of the respective eighteen intersections by inner products of the sixty three liner sum signals output from the sense line $SL_1$ and eighteen code sequences $D_{i,1}$ with a sequence length of 63 is provided, and the correction processing unit 24 corrects the estimated electrostatic capacitance values of the respective eighteen intersections by adding, to the estimated electrostatic capacitance values of the respective eighteen intersections, a signal S based on a value, which is obtained by adding the sixty three linear sum signals, with weight added.

Thereby, the correction processing unit 24 corrects the estimated electrostatic capacitance values by using the signal S based on a value obtained by adding N linear sum signals to perform addition by adding weight to the signal S. As a result thereof, it is possible to reduce an error between actual electrostatic capacitances values and the estimated electrostatic capacitance values.

According, the touch panel controller 3 is able to perform estimation of an electrostatic capacitance value more correctly.

Moreover, in the touch panel controller 3 in the present embodiment, the correction processing unit 24 adds weight according to a change in the number K of drive lines or a sequence length N of code sequences to the signal S based on the value obtained by adding N linear sum signals.

Specifically, the correction processing unit 24 adds, for example, "−(N−K+1)/K" as the weight according to a change in the number K of the drive lines or the sequence length N of the code sequences to the signal S based on the value obtained by adding the N linear sum signals.

This makes it possible to correct influence of a parasitic capacitance according to a change in the number K of the drive lines or the sequence length N of the code sequences.

Moreover, in the touch panel controller 3 in the present embodiment, the differential amplifier OP as an amplifier which amplifies respective linear sum signals from each of sense lines is provided in the sense lines.

That is, when each of the sense lines is accompanied by the parasitic capacitances Cp1 and Cp2 which are mutually different, signals based on charges of the parasitic capacitances Cp1 and Cp2 are input to the differential amplifier OP, thus bringing that an output of the differential amplifier OP is affected and an error occurs in an estimation value of each of electrostatic capacitance values.

Accordingly, by correcting the error, it is possible to perform estimation of an electrostatic capacitance value more correctly when the differential amplifier OP is provided in sense lines.

Note that, the invention is not limited to the aforementioned embodiment and can be modified variously within the scope of the invention. For example, as the coefficient used in the correction processing unit 24, the coefficient calculated from the sequence length N of the code sequences and the number K of the drive lines is used in the aforementioned embodiment, but the coefficient may be changed when a value of a parasitic capacitance changes according to a touch input.

That is, since a touch input is normally regarded as being grounded, a parasitic capacitance between a sense line and a ground changes due to the touch input in some cases.

The differential amplifier OP is used as the amplifier in the present embodiment, but a single-end amplifier may be also used.

Further, an M-sequence is used as a code sequence in the present embodiment, but without limitation thereto, other code sequences such as a Walsh code, a Hadamard code and a Gold sequence may be used.

[Embodiment 2]

Another embodiment of the invention will be described as follows based on FIG. 4. Note that, configurations other than ones described in the present embodiment are the same as those in Embodiment 1. Further, for convenience of description, the same reference signs are assigned to members having the same functions as those of members indicated in the drawings of Embodiment 1, and description thereof will be omitted.

A case where a touch panel device 1,1A is mounted as an electronic device in a mobile phone will be described based on FIG. 4 in the present embodiment. FIG. 4 is a block diagram illustrating a configuration of the mobile phone.

Figure 4:
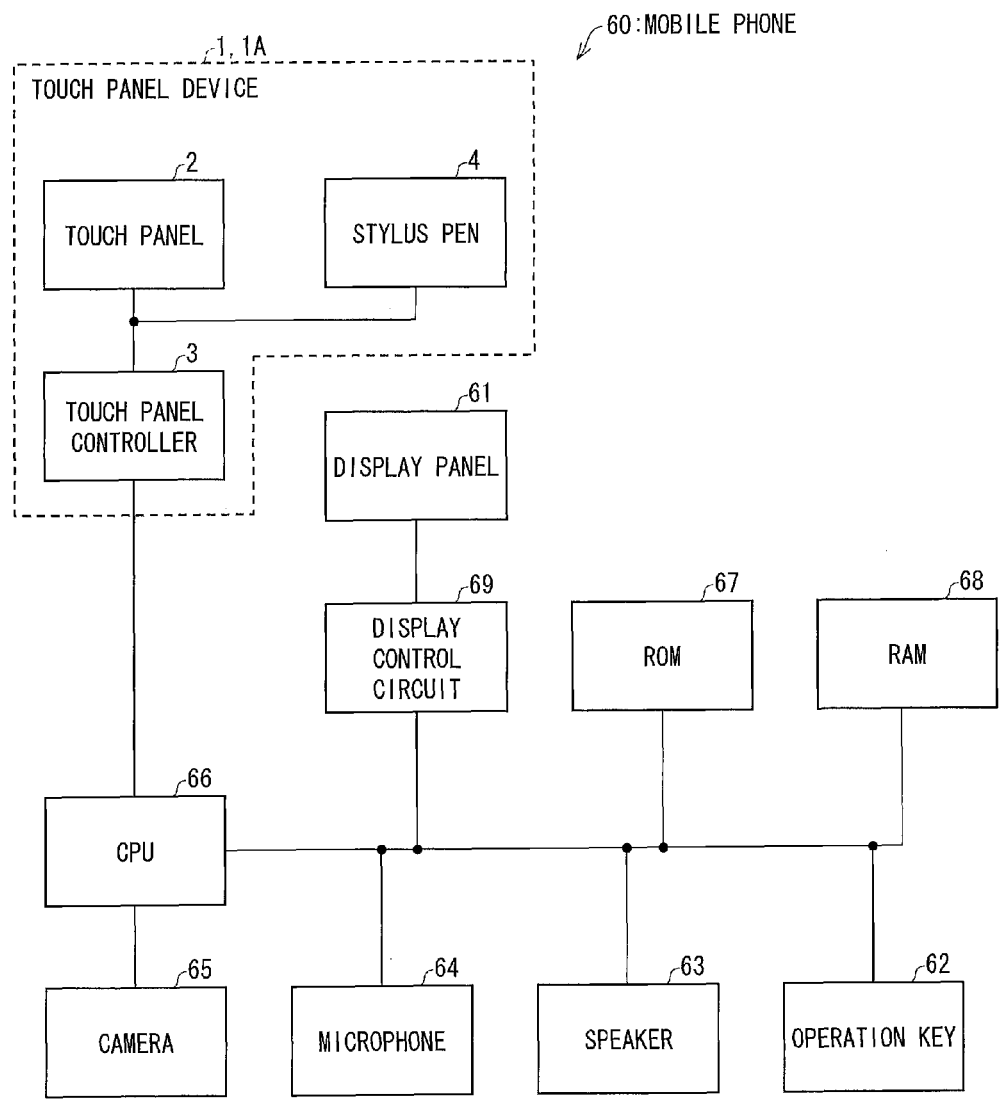
FIG. 4 is a block diagram illustrating a configuration of a mobile phone as an electronic device in Embodiment 2 of the invention.

A mobile phone 60 of the present embodiment includes, as illustrated in FIG. 4, the touch panel device 1,1A, a display panel 61, an operation key 62, a speaker 63, a microphone 64, a camera 65, a CPU 66, a ROM 67, a RAM 68 and a display control circuit 69. Respective components are mutually connected by a data bus.

The touch panel device 1,1A has, as described above, the touch panel 2, the touch panel controller 3 which detects electrostatic capacitances or a difference of the electrostatic capacitances, and a stylus pen 4 as an object to be detected. Note that, the object to be detected does not have to be the stylus pen 4, and may be a finger.

The display panel 61 displays an image, which is stored in the ROM 67 or the RAM 68, by the display control circuit 69. In addition, the display panel 61 is overlapped with the touch panel 2 or incorporates the touch panel 2.

The operation key 62 receives an input of an instruction by a user of the mobile phone 60.

The speaker 63 outputs a sound based on music data or the like stored, for example, in the RAM 68.

The microphone 64 receives an input of a voice of the user. The mobile phone 60 digitizes the input voice (analog data). The mobile phone 60 then sends the digitized voice to a communication partner (for example, another mobile phone).

The camera 65 photographs an object in response to an operation of the operation key 62 by the user. Image data of the object which has been photographed is stored in the RAM 68 or an external memory (for example, memory card).

The CPU 66 controls operations of the touch panel device 1,1A and the mobile phone 60. The CPU 66 executes a program, for example, stored in the ROM 67.

The ROM 67 stores data in a non-volatile manner. Further, the ROM 67 is a writable and erasable ROM, such as an EPROM (Erasable Programmable Read-Only Memory) or a flash memory. Though not illustrated in FIG. 4, the mobile phone 60 may be formed to include an interface (IF) for connection with other electronic device in a wired manner.

The RAM 68 stores, in a volatile manner, data generated when the CPU 66 executes a program or data which is input through the operation key 62.

In this manner, the mobile phone 60 as the electronic device in the present embodiment includes the touch panel device 1, 1A. This makes it possible to perform estimation of electrostatic capacitances more correctly, so that the touch panel controller 3 is able to be operated excellently. Accordingly, the mobile phone 60 is able to recognize a touch operation by a user more correctly, thus making it possible to execute processing desired by the user more correctly.

EXAMPLES

Example 1

In the present example, by using the touch panel device 1A of Embodiment 1, experiment was carried out for verifying an effect of correction by the correction processing unit 24 when an input of the differential amplifier OP was accompanied by the parasitic capacitances Cp1 to Cp2 as illustrated in FIG. 1, which will be described below.

First, in the present example, by using the touch panel device 1A of Embodiment 1, the effect of correction by the correction processing unit 24 was verified.

A condition for verification was that all the electrostatic capacitances $C_{1,1}$ to $C_{2,18}$ which are arranged at positions where drive lines and sense lines intersect with each other have electrostatic capacitances with 2.2 pF. In addition, an integration capacitance Cint of the differential amplifier OP was 8 pF. Further, when there was a touch input, electrostatic capacitance values of the electrostatic capacitances $C_{1,1}$ to $C_{2,18}$ decrease by 0.2 pF.

The parasitic capacitance Cp1 of the sense line $SL_1$ was 8 pF and the parasitic capacitance Cp2 of the sense line $SL_2$ was 12 pF. The code sequences $D_1$ to $D_{18}$ were M-sequences having the sequence length of N=63. Values of the code sequences $D_1$ to $D_{18}$ were changed for each clock and the same values were iterated every sixty three clocks. Further, a clock signal with 1 MHz was used. A power supply voltage VDD was 3.3 V and a common mode voltage Vcm was 1.65 V. The voltage applied to the drive lines when the code sequence was "1" was VDD/2+Vcm=3.3V and the voltage applied to the drive lines when the code sequence was "−1" was −VDD/2+Vcm=0V.

Figure 5:
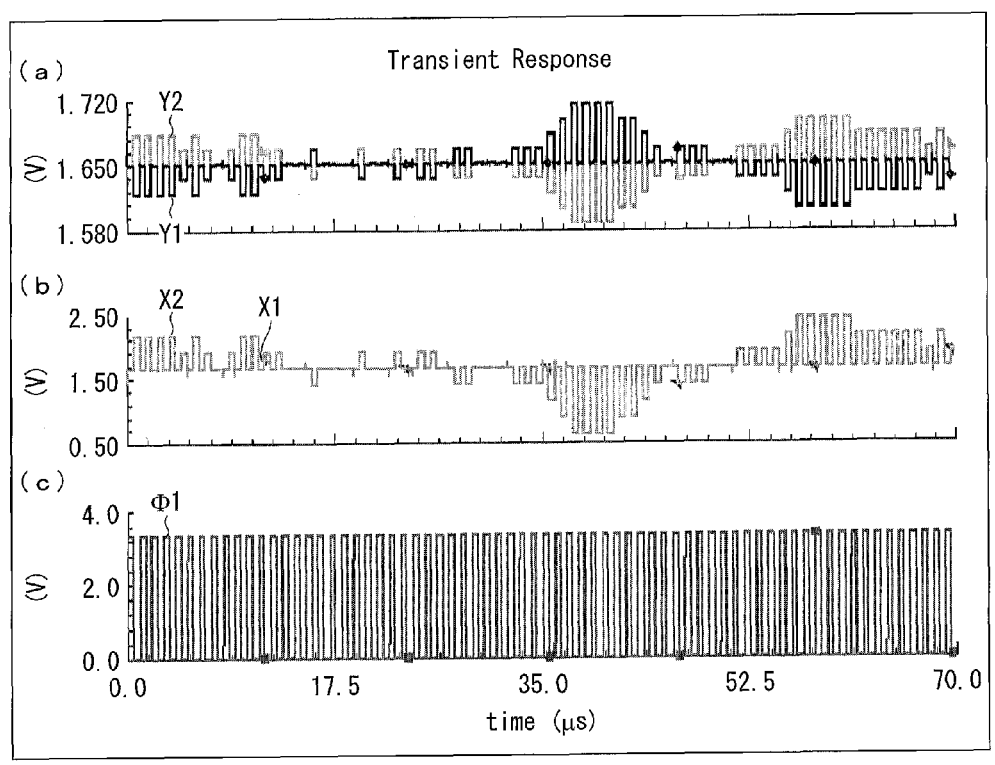
FIG. 5 (a) of FIG. 5 indicates the touch panel device in Example 1 of the invention, which is a waveform view indicating output signals Y1 and Y2 in a differential amplifier when there is no touch input, (b) is a waveform view indicating input signals X1 and X2 in the differential amplifier when there is no touch input, and (c) is a waveform view indicating a clock signal.

(a), (b) and (c) of FIG. 5 illustrate a clock signal ϕ1 and examples of waveforms of the input signals X1 and X2 of the differential amplifier OP and the output signals Y1 and Y2 of the differential amplifier OP when there is no touch input, in a case where experiment was carried out under the aforementioned condition. In each of (a), (b) and (c) of FIG. 5, a vertical axis indicates a voltage and a horizontal axis indicates a time. That is, as illustrated in (c) of FIG. 5, the voltage applied to the drive lines when the code sequence is "1" is VDD/2+Vcm=3.3V at the clock signal ϕ1 with 1 MHz. At this time, the input signals X1 and X2 of the differential amplifier OP when there is no touch input are illustrated in (b) of FIG. 5. Moreover, the output signals Y1 and Y2 of the differential amplifier OP are illustrated in (a) of FIG. 5. In (a) of FIG. 5, a portion where a pulse is generated indicates that the signal described by the formula (1) and the formula (4) is great. In (b) of FIG. 5, a portion where a pulse is generated indicates that the signal described by [Expression 19] is great.

Figure 6:
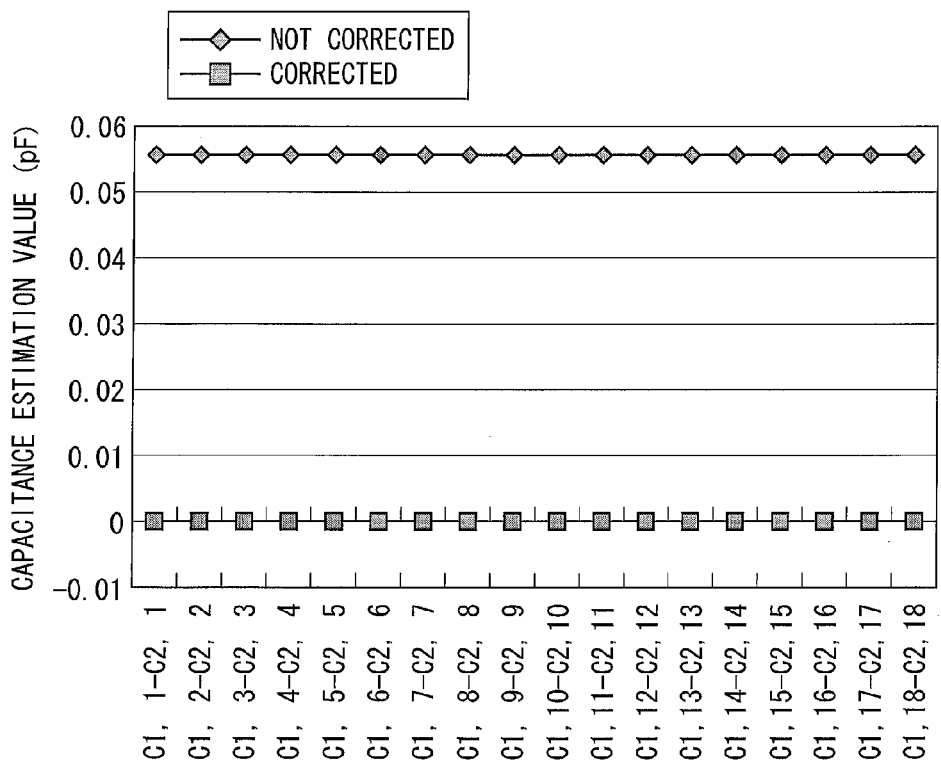
FIG. 6 indicates electrostatic capacitance values of the touch panel device in Example 1 above when there is no touch input, which is a graph indicating electrostatic capacitance values when correction processing is performed and electrostatic capacitance values when correction processing is not performed in comparison.

A difference between a case where correction processing was not to be performed in the correction processing unit 24 and a case where it was performed under the aforementioned condition will be described based on FIG. 6. FIG. 6 is a graph which indicates electrostatic capacitance values estimated by the inner product computation unit 23 and estimation values of the electrostatic capacitance values when correction processing was performed in the correction processing unit 24.

That is, the correction processing by the correction processing unit 24 in the present example was carried out, as indicated with the formula (12), by subtracting a signal obtained by multiplying a signal S obtained by adding linear sum signals output from the differential amplifier OP during one cycle period of the code sequences by (N−K+1)/K=(63−18+1)/18 from an estimation value of an electrostatic capacitance value obtained at the inner product computation unit 23.

As a result thereof, it was able to be confirmed that by performing the correction processing, the corrected capacitance estimation value becomes close to zero which is an essential input value when there are no parasitic capacitances Cp1 to Cp2 as illustrated in FIG. 6.

Example 2

In the present example, by using the touch panel device 1A of Embodiment 1, verification was carried out for an effect of correction by the correction processing unit 24 when there is a touch input.

The condition for the verification in the present example was the same as that of Example 1.

FIGS. 7(a), (b) and (c) illustrate a clock signal ϕ1 and examples of waveforms of the input signals X1 and X2 of the differential amplifier OP and the output signals Y1 and Y2 of the differential amplifier OP when there is a touch input near an intersection of the sense line $SL_1$ and the drive line $DL_1$1, under the condition for experiment. A vertical axis indicates a voltage and a horizontal axis indicates a time.

Figure 7:
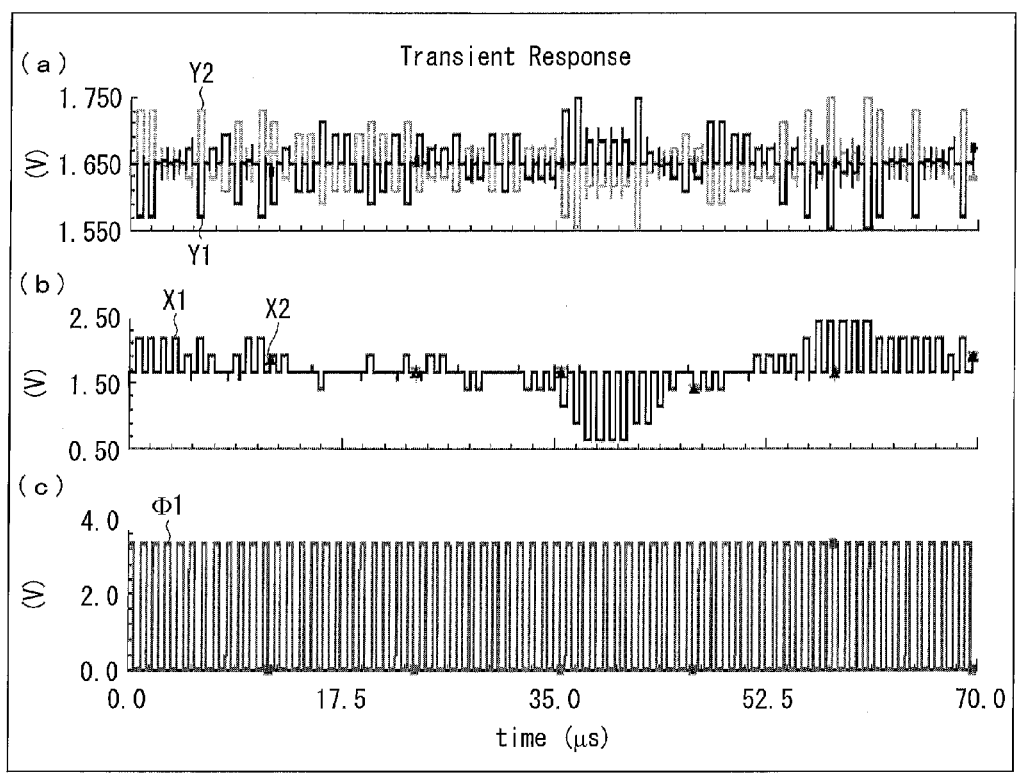
FIG. 7 (a) of FIG. 7 indicates a touch panel device in Example 2 of the invention, which is a waveform view indicating output signals Y1 and Y2 in a differential amplifier when there is a touch input, (b) is a waveform view indicating input signals X1 and X2 in the differential amplifier when there is a touch input, and (c) is a waveform view indicating a clock signal.

That is, as illustrated in (c) of FIG. 7, the voltage applied to the drive line when the code sequence is "1" is VDD/2+Vcm=3.3V at the clock signal with 1 MHz. At this time, the input signals X1 and X2 of the differential amplifier OP when there is no touch input are illustrated in (b) of FIG. 7. Moreover, the output signals Y1 and Y2 of the differential amplifier OP are illustrated in (a) of FIG. 7. In (a) of FIG. 7, a portion where a pulse is generated indicates that the signal described by the formula (1) and (4) is great. In FIG. (b) of 7, a portion where a pulse is generated indicates that the signal described by [Expression 19] is great. Further, a difference between (a) and (b) of FIG. 5 and (a) and (b) of FIG. 7 is that electrostatic capacitances change because there is the touch input in the example illustrated in (a) and (b) of FIG. 7.

A difference between a case where correction processing is not performed in the correction processing unit 24 and a case where it is performed under the aforementioned condition will be described based on FIG. 8. FIG. 8 is a graph which indicates electrostatic capacitance values estimated by the inner product computation unit 23 and estimation values of the electrostatic capacitance values when correction processing is performed in the correction processing unit 24.

That is, the correction processing by the correction processing unit 24 in the present example was carried out, as indicated with the formula (12), by subtracting a signal obtained by multiplying a signal S obtained by adding linear sum signals output from the differential amplifier OP during one cycle period of the code sequences by (N−K+1)/K=(63−18+1)/18 from an estimation value of an electrostatic capacitance value obtained at the inner product computation unit 23.

As a result thereof, it was able to be confirmed that by performing the correction processing, as illustrated in FIG. 8, the electrostatic capacitance estimation value $C_{1,11\text{-}2,11}$ of the electrostatic capacitance C1,11-C2,11 at a portion of the drive line $DL_{11}$, in which there is a touch input, becomes close to −0.2 pF which is an essential input value and confirmed that a portion where there is no touch input becomes close to zero which is an essential input value.

SUMMARY

A touch panel controller 3 in an aspect 1 of the invention is the touch panel controller 3 which obtains, with a change in K electrostatic capacitances (C1,1 to C1,18) which are respectively formed between a sense line SL1 and K drive lines ($DL_1$ to $DL_{18}$) (K is an integer of 2 or more) when an object to be detected touches a touch panel 2 having the electrostatic capacitances (C1,1 to C1,18), a touched position of the object to be detected: including a driving unit 10 which drives the drive lines ($DL_1$ to $DL_{18}$) and causes a linear sum signal based on charges accumulated in the respective electrostatic capacitances (C1,1 to C1,18) to be output from the sense line SL1; and a correction unit (correction processing unit 24) which corrects influence on the linear sum signal by a parasitic capacitance Cp1 which exists in the sense line SL1.

According to the aforementioned invention, the touch panel controller obtains the touched position with the change in the K electrostatic capacitances which are formed at respective intersections of the sense line and the K drive lines on the touch panel when the object to be detected touches the touch panel.

Meanwhile, in the touch panel controller of this kind, a sense line is accompanied by a parasitic capacitance, and an error is caused in an estimation value of each of electrostatic capacitance values in some cases due to influence of the parasitic capacitance.

Thus, the driving unit which drives the K drive lines and causes a linear sum signal based on charges accumulated in electrostatic capacitances formed at respective intersections with the sense line to be output from the sense line, and the correction unit which corrects influence on the linear sum signal by a parasitic capacitance which exists in the sense line are provided in the invention. Therefore, an estimation value of each electrostatic capacitance value in which there is substantially no parasitic capacitance is obtained by the correction unit.

Accordingly, it is possible to provide the touch panel controller capable of performing estimation of an electrostatic capacitance value more correctly by correcting the influence of the parasitic capacitance which exists in the sense line.

In the touch panel controller 3 in an aspect 2 of the invention, it is preferable that the touch panel 2 further has different K electrostatic capacitances (C2,1 to C2,18) which are respectively formed between a different sense line SL2 and the K drive lines (DL$_1$ to DL$_{18}$), a different parasitic capacitance Cp2 exists in the different sense line SL2, and a value of the parasitic capacitance Cp1 is different from a value of the different parasitic capacitance Cp2.

According to the aforementioned configuration, when the value of the parasitic capacitance Cp1 is different from the value of the different parasitic capacitance Cp2, it is possible to correct the influence on the change in the electrostatic capacitances is able to be corrected.

In the touch panel controller 3 in an aspect 3 of the invention, it is preferable that the value of the parasitic capacitance Cp1 changes according to a touch of the object to be detected to the touch panel 2.

According to the aforementioned configuration, when the value of the parasitic capacitance changes according to the touch of the object to be detected to the touch panel, it is possible to correct the influence on the change in the electrostatic capacitances.

In the touch panel controller 3 in an aspect 4 of the invention, it is preferable that the driving unit 10 drives the K drive lines (DL$_1$ to DL$_{18}$) in parallel by K code sequences having a sequence length of N (N is an integer), which correspond to the K drive lines (DL$_1$ to DL$_{18}$), and causes N linear sum signals to be output from the sense line SL1, an inner product computation unit 23 which estimates values of the K electrostatic capacitances (C1,1 to C1,18) by computation of inner products of the N linear sum signals output from the sense line SL1 and the K code sequences having the sequence length of N is further provided, and the correction unit (correction processing unit 24) adds a value, which is obtained by adding weight to a signal based on a value obtained by adding the N linear sum signals, to the values of the K electrostatic capacitances (C1,1 to C1,18) estimated by the inner product computation unit 23 to thereby correct the values of the electrostatic capacitances.

Thereby, the correction unit corrects the estimated electrostatic capacitance values by using the signal based on the value obtained by adding the N linear sum signals and adding the weight to the signal. As a result, an error between the actual electrostatic capacitance values and the estimated electrostatic capacitance values is able to be reduced.

Accordingly, the touch panel controller is able to perform estimation of an electrostatic capacitance value more correctly.

In the touch panel controller 3 in an aspect 5 of the invention, it is preferable that the correction unit (correction processing unit 24) adds weight according to a change in the number K of the drive lines (=18) or the sequence length N of the code sequences (=63) to the signal S based on the value obtained by adding the N (=63) linear sum signals, in the touch panel controller 3 of the aspect 4.

Specifically, the correction unit performs addition by adding, for example, "$-(N-K+1)/K$" as the weight according to the change in the number K of the drive lines or the sequence length N of the code sequences to the signal based on the value obtained by adding the N linear sum signals.

This makes it possible to correct influence of a parasitic capacitance according to the change in the number K of the drive lines or the sequence length N of the code sequences.

In the touch panel controller 3 in an aspect 6 of the invention, it is preferable that an amplifier (differential amplifier OP) which amplifies the linear sum signal output from the sense line SL$_1$ is further provided in the touch panel controller 3 of the aspect 1.

That is, when the sense line is accompanied by a parasitic capacitance, a signal based on charges accumulated in the parasitic capacitance is input to the amplifier, thus bringing that an output of the amplifier is affected and an error occurs in an estimation value of each of electrostatic capacitance values.

Accordingly, it is possible to perform estimation of an electrostatic capacitance value more correctly when the amplifier is provided in the sense line.

It is preferable that an electronic device (mobile phone 60) in an aspect 7 of the invention includes the touch panel controller 3 according to any of aspects 1 to 6 and the touch panel 2 which is controlled by the touch panel controller 3.

Thereby, it is possible to provide the electronic device including the touch panel controller capable of performing estimation of an electrostatic capacitance value more correctly.

An integrated circuit in an aspect 8 of the invention integrates the touch panel controller 3 according to any one of aspects 1 to 4.

A touch panel device 1,1A in an aspect 9 of the invention is the touch panel device 1,1A including the touch panel controller 3 according to any one of aspects 1 to 4, and includes the touch panel 2 which is controlled by the touch panel controller 3.

Note that, the invention is not limited to each of the embodiments described above and can be modified variously within the scope defined by the claims, and embodiments obtained by appropriately combining technical means disclosed in different embodiments are also included in the technical scope of the invention.

INDUSTRIAL APPLICABILITY

The invention is able to be used for a touch panel controller which drives a plurality of drive lines in parallel to estimate or detect electrostatic capacitance values of electrostatic capacitances which are formed in a matrix manner, and an electronic device using the same. The invention is also applicable to a fingerprint detection system.

REFERENCE SIGNS LIST 1,1A touch panel device
2 touch panel 3 touch panel controller
4 stylus pen (object to be detected)
10 driving unit
21 AD conversion unit
22 signal processing unit
23 inner product computation unit
24 correction processing unit (correction unit)
60 mobile phone (electronic device)
61 display panel
C1,1 to CL,K electrostatic capacitance
$C_{1,1}$ to $C_{L,K}$ electrostatic capacitance value
Cp1, Cp2 parasitic capacitance
$D_1$ to $D_K$ code sequence
$DL_1$ to $DL_{18}$ drive line
OP differential amplifier
SL1, SL2 sense line
X1, X2 input signal
Y1, Y2 output signal

The invention claimed is:

1. A touch panel controller which obtains, with a change in K electrostatic capacitances which are respectively formed between a sense line and K drive lines (K is an integer of 2 or more) when an object to be detected touches a touch panel having the electrostatic capacitances, a touched position of the object to be detected: comprising
   a driving unit which drives the drive lines and causes a linear sum signal based on charges accumulated in the respective electrostatic capacitances to be output from the sense line; and
   a correction unit which corrects influence on the linear sum signal by a parasitic capacitance which exists in the sense line,
   the driving unit driving the K drive lines in parallel by K code sequences having a sequence length of N (N is an integer), which correspond to the K drive lines, and causing N linear sum signals to be output from the sense line,
   the touch panel controller further comprising:
   an inner product computation unit which estimates values of the K electrostatic capacitances by computation of inner products of the N linear sum signals output from the sense line and the K code sequences having the sequence length of N,
   the correction unit adding a value, which is obtained by adding weight to a signal based on a value obtained by adding the N linear sum signals, to the values of the K electrostatic capacitances estimated by the inner product computation unit to thereby correct the values of the electrostatic capacitances.

2. The touch panel controller according to claim 1, wherein
   the touch panel further has different K electrostatic capacitances which are respectively formed between a different sense line and the K drive lines,
   a different parasitic capacitance exists in the different sense line, and
   a value of the parasitic capacitance is different from a value of the different parasitic capacitance.

3. The touch panel controller according to claim 1, wherein the value of the parasitic capacitance changes according to a touch of the object to be detected to the touch panel.

4. An electronic device comprising
   the touch panel controller according to claim 1 and the touch panel which is controlled by the touch panel controller.

* * * * *